US010076742B2

(12) United States Patent
Grossman et al.

(10) Patent No.: US 10,076,742 B2
(45) Date of Patent: Sep. 18, 2018

(54) METHODS FOR REGENERATION OF AN ORGANOSILICA MEDIA

(71) Applicant: ProSep, Inc., Houston, TX (US)

(72) Inventors: Michael Grossman, Houston, TX (US); Greg Hallahan, Houston, TX (US); Caleb Smathers, Houston, TX (US)

(73) Assignee: ProSep, Inc., Houston, TX (US)

( * ) Notice: Subject to any disclaimer, the term of this patent is extended or adjusted under 35 U.S.C. 154(b) by 37 days.

(21) Appl. No.: 15/047,171

(22) Filed: Feb. 18, 2016

(65) Prior Publication Data

US 2016/0243527 A1  Aug. 25, 2016

Related U.S. Application Data

(60) Provisional application No. 62/118,418, filed on Feb. 19, 2015.

(51) Int. Cl.
| | |
|---|---|
| *C07C 7/12* | (2006.01) |
| *B01J 20/34* | (2006.01) |
| *C10L 3/10* | (2006.01) |
| *B01J 20/22* | (2006.01) |
| *C10L 3/06* | (2006.01) |

(52) U.S. Cl.
CPC ............... *B01J 20/34* (2013.01); *B01J 20/22* (2013.01); *C10L 3/06* (2013.01); *C10L 3/101* (2013.01); *C10L 2230/02* (2013.01); *C10L 2290/06* (2013.01); *C10L 2290/12* (2013.01); *C10L 2290/542* (2013.01)

(58) Field of Classification Search
CPC .. C10L 3/101; B01J 20/34; B01J 20/22; B01J 20/26; B01J 20/265; B01J 20/267; B01J 20/268

USPC ........................................................... 585/826
See application file for complete search history.

(56) References Cited

U.S. PATENT DOCUMENTS

| | | | | |
|---|---|---|---|---|
| 3,559,296 | A * | 2/1971 | Dratwa ................. | C01B 31/086 34/332 |
| 6,610,124 | B1 * | 8/2003 | Dolan ................... | B01D 53/02 95/105 |
| 7,790,830 | B2 | 9/2010 | Edmiston ......................... | 528/34 |
| 8,119,759 | B2 | 2/2012 | Edmiston ......................... | 528/35 |
| 8,367,793 | B2 | 2/2013 | Edmiston ......................... | 528/35 |
| 2011/0315012 | A1 | 12/2011 | Kuznicki | |

(Continued)

OTHER PUBLICATIONS

"Osorb Media Technology to be Regenerated", Industrial Environment (2013); pp. 1-2.*

(Continued)

*Primary Examiner* — Philip Y Louie
*Assistant Examiner* — Aaron W Pierpont
(74) *Attorney, Agent, or Firm* — Norton Rose Fulbright US LLP

(57) ABSTRACT

Methods for regenerating a bed of organosilica particles and producing a treated gaseous stream are described herein. A method for regenerating a bed of organosilica particles includes introducing a heated regenerate stream to a bed of organosilica particles comprising captured C3+ hydrocarbons under conditions sufficient to remove at least a portion of the captured C3+ hydrocarbons from the organosilica particles; and introducing a cooled regenerate gaseous stream to the heated bed of organosilica particles. The regenerated organosilica particles are used to treat additional gaseous streams.

16 Claims, 15 Drawing Sheets

(56) References Cited

U.S. PATENT DOCUMENTS

| | | | | |
|---|---|---|---|---|
| 2012/0042689 A1* | 2/2012 | Bresler | ............. | B01D 53/0438 |
| | | | | 62/611 |
| 2012/0222552 A1 | 9/2012 | Ravikovitch | | |
| 2015/0290575 A1* | 10/2015 | Rothermel | ............. | C10L 3/101 |
| | | | | 95/148 |
| 2016/0355743 A1* | 12/2016 | Matteucci | ............. | B01J 20/267 |

OTHER PUBLICATIONS

Jacobs, T. "Reusable Fitration Technology Under Development"; SPE JPT (2014); pp. 1-5.*

Haynes, W. M. "CRC Handbook of Chemistry and Physics", 95th ed. Internet Version (2015); p. 244.*

"Osorb Media Technology to Be Regenerated.." The Free Library. 2013 Worldwide Videotex Jun. 23, 2016. Accessed online: http://www.thefreelibrary.com/OSORB+MEDIA+TECHNOLOGY+TO+BE+REGENERATED.-a0345082550.

Jacobs, "Reusable Filtration Technology Under Development", SPE News, Sep. 11, 2014. Accessed online: http://www.spe.org/news/article/reusable-filtration-technology-under-development.

* cited by examiner

METHODS FOR REGENERATION OF AN ORGANOSILICA MEDIA

CROSS REFERENCE TO RELATED APPLICATIONS

This application claims benefit to U.S. Provisional Patent Application No. 62/118,418 titled "METHODS FOR REGENERATION OF AN ORGANOSILICA MEDIA", to Grossman et al., filed Feb. 19, 2015. The entire content of the referenced application is incorporated by reference without disclaimer.

BACKGROUND OF THE INVENTION

A. Field of the Invention

The invention generally concerns the treatment of gaseous streams to remove $C_3+$ hydrocarbons. In particular, the invention relates to contacting a gaseous stream with organosilica particles to remove $C_3+$ hydrocarbons and the regeneration of the organosilica particles.

B. Description of Related Art

Natural gas produced from oil and gas wells normally includes a mixture of hydrocarbon components having varying boiling points. That is, a gas stream produced from a well contains a mixture of hydrocarbon components which exist in the vapor phase at the particular pressure and temperature levels at which the well is produced. If the gas stream pressure is changed or the temperature is decreased, or both, some of the hydrocarbon components contained in the gas stream are liquefied or condensed. The temperature at which some of the components of a gas stream comprised of hydrocarbons will condense at a particular pressure level is known as the hydrocarbon dew point (HCDP) of the gas stream.

Transporting gas streams with a high HCDP from remote natural gas wells can create a risk of condensate formation in the pipelines. As the gas passes through the transmission pipeline, the pressure of the gas drops due to friction, and particularly during the winter months, the temperature of the gas is lowered due to atmospheric conditions. Thus, condensable components contained within the gas stream passing through the pipeline are condensed. Additionally, if the gas contains large quantities of heavy hydrocarbons, then the HCDP of the gas will be high and small changes in the temperature or the pressure of the gas are more likely to cause liquids to condense out of the gas. Formation of condensate is detrimental in that the flow of gas through the system is impaired and can cause severe problems for downstream equipment, or may result in explosions or fires.

Various methods and apparatuses have been developed for removing condensable components from gas streams prior to the gas entering the transmission pipe line. Most liquid hydrocarbon droplets entrained in the gas stream can be removed using conventional separation technologies. One of the first steps in processing gas involves putting it though a 2-phase or 3-phase separator, which allows liquid hydrocarbons to fall out of the gas by gravity separation. Additional separation is often achieved with a coalescing filter which uses physical barriers to impede the flow of liquid droplets while allowing the vapor to pass through. Although these technologies are efficient at bulk removal of liquid droplets, they suffer from the inability to remove extremely small droplets let alone heavy hydrocarbons that are still in the vapor phase; thus, they cannot significantly reduce the HCDP of the stream.

Technologies for reduction of HCDP may require manipulation of the thermodynamic properties of the gas stream. In mechanical refrigeration, the stream is cooled to a temperature at which all of the heavy hydrocarbons condense out of the vapor phase and can be removed from the stream in a controlled manner. Joule-Thomson (J-T) throttling involves rapid depressurization of the gas stream which cools the gas and forces the heavy hydrocarbons to condense. Although highly effective at reducing the HCDP of a natural gas stream, mechanical refrigeration and J-T throttling suffer from the requirement of a large energy input or an expenditure of the energy stored in the gas, respectively; thus these processes are not always economically viable to implement when limited utilities are available.

Some adsorbent media can also reduce the HCDP of natural gas streams by capturing the heaviest hydrocarbons in the vapor phase; silica ($SiO_2$) gel, granular activated carbon (GAC), and some proprietary materials can be used in this way. These technologies suffer from large footprints depending on the volume of material needed, and they generate large quantities of waste if the material cannot be reused. The technologies also suffer in that they require medium to high pressures to lower the hydrocarbon dew point value of the natural gas stream.

SUMMARY OF THE INVENTION

A solution to the disadvantages of the currently available technologies to remove heavy hydrocarbons from a gaseous stream (for example, a natural gas stream) using a media that can be regenerated has been discovered. The solution is based on the surprising discovery that organosilica particles have the ability to remove propane and heavier ($C_3+$) hydrocarbons or butanes and heavier ($C_4+$) hydrocarbons from natural gas at pressures lower than those used in conventional absorption technologies. Removal of these heavy hydrocarbons can reduce the HCDP of the produced gas, lower the Wobbe Index of the gas, lower the heating value of the gas, and increase the methane number of the gas. Lowering the hydrocarbon dew point value of the gaseous stream can enable production at more wells. As an additional benefit, the effluent stream can be used as instrument gas, which eliminates the need for the utilities and equipment needed to create instrument air. Without wishing to be bound by theory, it is believed that the organosilica particles captures each individual hydrocarbon in proportion to the partial pressure divided the saturated vapor pressure of that species. Further, the organosilica particles can be regenerated using a heated regenerate stream.

In one aspect of the present invention, a method for regenerating a bed of organosilica particles can include (a) introducing a heated regenerate stream to a bed of organosilica particles comprising $C_{3+}$ hydrocarbons under conditions sufficient to remove at least a portion of the $C_{3+}$ hydrocarbons from the organosilica particles and (b) introducing a cooled regenerate gaseous stream to the heated bed of organosilica particles. The $C_{3+}$ hydrocarbons can be attached to the organosilica particles through absorption or adsorption, or both. The temperature of the regenerate gas can be from 50° C. or above, 200° C. or above, or 250° C. or above at 1 atm of pressure or above. Such a temperature is sufficient to heat the bed of organosilica particles to a temperature of 50° C. or above, or 50 to 175° C. at 1 atm of pressure or above. In some aspects of the invention the bed of organosilica particles can be heated using an additional heat source, for example, a heated coil in the bed or a liquid heat exchange fluid that circulates through a coil in the bed.

In a preferred aspect, the heated regenerate stream is the only heat source used to heat the bed of organosilica particles. The heated regenerate stream can include non-hydrocarbon compounds, hydrocarbons or both, with hydrocarbons being preferred. A heated hydrocarbon regenerate stream can include hydrocarbons having a carbon number from 1 to 3 or from 1 to 2. Non-hydrocarbons can include water, or inert gases (for example, argon, helium, nitrogen, or both). In some instances, the heated regenerate stream can be a slip stream from the treated gaseous stream obtained from contact of a gaseous stream (untreated) with the organosilica particles. The heated regenerate stream can flow in a direction that is concurrent or counter current to the gaseous stream previously contacted with the organosilica particles. In some embodiments, steps (a) and (b) can be repeated until a majority of the $C_3+$ hydrocarbons are removed from the organosilica particles, or until a majority of $C_4+$ hydrocarbons are removed (desorbed), or at least 90%, at least 99%, at least 99.9% of the $C_3+$ hydrocarbons are removed from the organosilica particles. After the heated regenerate stream has contacted the organosilica particles, the contacted gaseous stream can include hydrocarbon that have been removed from the organosilica particles in addition to the hydrocarbons or other gas present in the heated regenerate stream. The removed $C_3+$ hydrocarbons can be collected using known methods for collecting and/or separating gaseous and liquid hydrocarbons. The heated regenerate stream can be cooled after exiting the bed of organosilica particles to temperature that can condense hydrocarbons from the gaseous phase. Condensed hydrocarbons can have a carbon number of 3 to 15 or more, 4 to 13, or 5 to 10.

The cooled regenerate stream can include non-hydrocarbon compounds, hydrocarbons or both, with hydrocarbons being preferred. The direction of the cooled regenerate gaseous stream can be concurrent or countercurrent to the flow of the heated regenerate gaseous stream. In a preferred aspect, the cooled regenerate stream can include hydrocarbons having a carbon number from 1 to 3 or from 1 to 2.

In one aspect of the present invention, the regeneration of the organosilica particles can be used in combination with treating a gaseous stream that includes mixture of hydrocarbons. Treating a gaseous stream can include contacting a gaseous stream that includes $C_3+$ hydrocarbons with organosilica particles under conditions sufficient to capture at least a portion of the $C_3+$ hydrocarbons from the gaseous stream and to obtain a treated gaseous stream. The contacting can be periodically stopped or substantially stopped and the organosilica particles can be regenerated as described throughout the specification. The treating of a gaseous stream, periodically discontinuing the flow of the gaseous stream, and the regeneration of the organosilica particles can be alternated as needed to maintain one or more properties of the treated gaseous stream. Non-limiting examples of such properties include hydrocarbon dew point, higher heating value, Wobbe Index, methane number, or a combination thereof.

The contacting conditions to obtain a treated gaseous stream can include a temperature of 60° C. or less and at a pressure of 0.1 MPa(g) or more. The treated gaseous stream has a lower hydrocarbon dew point value than the gaseous stream prior to contacting. The pressure can be 5.5 MPa(g) or less, 4, MPa(g) or less, 2.5 MPa(g) or less, or from 0.2 to 10 MPa(g), 0.5 to 8 MPa(g), from 0.6 to 4.5 MPa(g), or from 2.8 to 4.1 MPa(g). In some instances, the pressure is greater than 10 MPa(g). A temperature of the gaseous stream (untreated stream) can range from 5 to 50° C., 15 to 35° C., or 20 to 25° C. at these pressures. In some instances, the temperature is less than 5° C. The treatment can be monitored using a hydrocarbon dew point analyzer or a gas chromatograph. The treatment can be discontinued when the hydrocarbon dew point goes above a desired value and/or when $C_3$ hydrocarbons or $C_4+$ hydrocarbons are detected in the treated gaseous stream. In some instances, the gaseous stream is a natural gas stream obtained from wellhead coupled to a producing well in a hydrocarbonaceous formation (for example, a shale oil formation). In some instances the gaseous stream is obtained from gas processing equipment and/or a wellhead. The gaseous stream can include non-hydrocarbon compounds. The gaseous stream can include inert gases (for example, helium, argon, nitrogen, or mixtures thereof), oxygen, hydrogen sulfide, ammonia, water, carbon oxides (for example, carbon dioxide and carbon monoxide) and mixtures thereof. In some embodiments, the water content of the gaseous stream may be deemed high and the gaseous stream can be dried prior to and/or after contacting the gaseous stream with the organosilica particles. The HCDP of the gaseous stream can be greater than 15° C., 20° C. or more, or 25° C. or more. The gaseous stream can include $C_1$, $C_2$, $C_3+$ hydrocarbons and mixtures thereof and the treated gaseous stream can include $C_1$, $C_2$, and $C_3$ hydrocarbons. The HCDP of the treated gaseous stream can be −50° C. or less, −5° C. or less, 0° C. or less, or range from −150 to 15° C., from −90 to 10° C., or from −5 to 0° C. The treated gas stream can have less $C_{3+}$ hydrocarbons and/or $C_{4+}$ hydrocarbons than the gaseous stream prior to contacting. In some instances, the treated gaseous stream also includes $C_4$ hydrocarbons. The treated gaseous stream can have a total hydrocarbon content of 50 mol % or more, 90 mol % or more, 95 mol % or more, or 99 mol % or more of $C_1$ to $C_3$ hydrocarbons. In a particular instance, the treated hydrocarbonaceous stream includes 0.1 mol % or less of $C_{4+}$ hydrocarbons. The treated gaseous stream can meet pipeline specifications for natural gas. In some instances, the treated gaseous stream can be used as instrument gas.

The organosilica particles can have an average particle size of less than 500 μm, or from 250 to 500 μm and a surface area of 18 to 800 $m^2/g$, or from 300 to 500 $m^2/g$. The organosilica particles can absorb $C_{4+}$ hydrocarbons and, in some instances, $C_3+$ hydrocarbons. In some instances, the organosilica particles are provided to a vessel that is coupled to the gas processing equipment and/or the wellhead. In other embodiments, the organosilica particles are in a vessel that is then coupled to the gas processing equipment and/or wellhead. The organosilica particles can include an alkylsiloxy substituent. The organosilica particles can capture hydrocarbons in proportion to the partial pressure divided by the saturated vapor pressure of the specific hydrocarbon species. Said another way, the organosilica particles have a higher affinity for higher molecular weight hydrocarbons than lower molecular weight hydrocarbons. The affinity can be shown as $C_{6+}>C_5>C_4>C_3>C_2>C_1$. In a preferred aspect, the organosilica particles capture a minimal amount of or no $C_{1-2}$ hydrocarbons. After a period of time, the organosilica particles become saturated with $C_3$ hydrocarbons, $C_4$ hydrocarbons or both, but continue to capture $C_4+$ hydrocarbons, and, in some instances, $C_5+$ hydrocarbons. In such cases, the resulting treated gaseous streams can include $C_{1-3}$ hydrocarbons or $C_{1-4}$ hydrocarbons with the balance being non-hydrocarbon compounds.

The method can also include contacting a portion of the treated gaseous stream with additional organosilica particles to remove additional hydrocarbons from the treated gaseous stream to produce an additional treated gaseous stream. The additional treated gaseous stream has a lower hydrocarbon dew point than the treated gaseous stream and/or the gaseous stream prior to contacting. The additional treated gaseous stream and the treated gaseous stream can be combined. The additional treated gaseous stream can have fewer $C_3+$ hydrocarbons than the treated gaseous stream. In some embodiments, the method can include providing a portion of the gaseous stream that includes $C_3+$ hydrocarbons to a first vessel; providing another portion of the gaseous stream that includes a $C_3+$ hydrocarbons to a second vessel; and contacting each gaseous stream that includes a $C_3+$ hydrocarbons with organosilica particles at a temperature of 60° C. or less and pressure of 0.1 MPa(g) or more to capture at least a portion of the hydrocarbons from the gaseous stream to obtain two treated gaseous stream. The hydrocarbon dew point value of each treated gaseous stream is lower than the hydrocarbon dew point value of the gaseous stream prior to contacting. The two treated gaseous streams can be combined to form a combined treated gaseous stream. The treated gaseous stream, additional treated gaseous streams and/or combined treated gaseous streams can meet natural gas pipeline specifications. In some instances, the treated gaseous stream, additional treated gaseous streams and/or combined treated gaseous streams can be used as instrument gas.

The treated gaseous stream, additional treated gaseous stream and/or combined gaseous stream can be provided to another bed of organosilica particles and a portion of the treated gaseous stream can be contacted with additional organosilica particles to remove additional hydrocarbons from the treated gaseous stream to produce an additional treated gaseous stream. The resulting treated gaseous stream has a lower hydrocarbon dew point than the treated gaseous stream.

In another aspect of the present invention, a method for treating a gaseous stream includes contacting a gaseous stream comprising a mixture of $C_1$, $C_2$, and $C_3+$ hydrocarbons with organosilica particles at a temperature of 60° C. or less and pressure of 0.1 MPa(g) or more to capture at least a portion of the hydrocarbons from the gaseous stream and to obtain a treated gaseous stream. The treated gaseous stream can include a mixture of hydrocarbons having fewer $C_3+$ hydrocarbons than the gaseous stream prior to contacting. In some instances, the treated gaseous stream has a lower Wobbe Index, for example, at least 5% lower, than the Wobbe Index of the gaseous stream prior to contacting. In another aspect, the higher heating value of the treated gaseous stream is lower, for example, at least 5% lower, than the higher heating value of the gaseous stream prior to contacting. In another aspect, the treated gaseous stream has a higher methane value, for example, at least 5% higher, than the methane value of the gaseous stream prior to contacting. The treated gaseous stream of the present invention can be provided to purification system that includes a membrane unit and/or an amine system to remove non-hydrocarbon contaminants and/or separate the hydrocarbon gases.

In the context of the present invention 45 embodiments are described. Embodiment 1 is a method for regenerating a bed of organosilica particles, which includes (a) introducing a heated regenerate stream to a bed of organosilica particles that includes captured $C_3+$ hydrocarbons under conditions sufficient to remove at least a portion of the captured $C_3+$ hydrocarbons from the organosilica particles; and (b) introducing a cooled regenerate gaseous stream to the heated bed of organosilica particles. Embodiment 2 is the method of embodiment 1, wherein a temperature of the heated regenerate stream is 50° C. or above, 200° C. or above, or 250° C. or above at 1 atm of pressure or above. Embodiment 3 is the method of embodiment 2, wherein the temperature of the heated bed of organosilica particles is 50° C. or above, or 50 to 175° C. at 1 atm of pressure or above. Embodiment 4 is the method of any one of embodiments 1 to 3, wherein the cooled regenerate gaseous stream includes the removed $C_3+$ hydrocarbons. Embodiment 5 is the method of any one of embodiments 1 to 4 that includes repeating (a) and (b) until a majority of the $C_3+$ hydrocarbons are removed from the organosilica particles. Embodiment 6 is the method of embodiment 5, wherein the (a) and (b) are repeated until at least 90%, at least 99%, at least 99.9% of the $C_{3+}$ hydrocarbons are removed from the organosilica particles. Embodiment 7 is the method of any one of embodiments 1 to 6 that includes obtaining the bed of organosilica particles comprising the $C_{3+}$ hydrocarbons prior to step (a). Embodiment 8 is the method of any one of embodiments 1 to 7 that includes heating the bed of organosilica particles in step (b) with an additional heat source. Embodiment 9 is the method of any one of embodiments 1 to 8, wherein the heated regenerate stream is the only heat source used to heat the bed of organosilica particles. Embodiment 10 is the method of any one of embodiments 1 to 9, wherein the removed hydrocarbons have a boiling point of −50° C. to 250° C. at standard temperature and pressure (STP, 1 atm and 25° C.). Embodiment 11 is the method of any one of embodiments 1 to 10 that includes collecting the removed hydrocarbons. Embodiment 13 is the method of embodiment 12, wherein the removed hydrocarbons have a carbon number from 3 to 15, from 4 to 12, or from 5 to 7. Embodiment 14 is the method of any one of embodiments 1 to 12, wherein the heated regenerate stream includes non-hydrocarbon compounds, hydrocarbons or both. Embodiment 15 is the method of embodiment 13, wherein the heated regenerate stream includes hydrocarbons having a carbon number from 1 to 3 or from 1 to 2. Embodiment 16 is the method of embodiment 13, wherein the heated regenerate stream includes non-hydrocarbon compounds. Embodiment 17 is the method of embodiment 15, wherein the non-hydrocarbons include nitrogen or inert gas. Embodiment 18 is the method of any one of embodiments 1 to 16, wherein the heated regenerate stream is obtained by contacting a gaseous stream that includes a mixture of $C_3+$ hydrocarbons with the organosilica particles prior to (a), wherein the organosilica particles are not saturated with captured $C_3+$ hydrocarbons. Embodiment 18 is the method of any one of embodiments 1 to 17, wherein a direction of the flow of heated regenerate gaseous stream is concurrent or countercurrent to a flow of the gaseous stream comprising $C_{3+}$ hydrocarbons in step (a). Embodiment 19 is the method of any one of embodiments 1 to 18, wherein a direction of the cooled regenerate gaseous stream is concurrent or countercurrent to the flow of the heated regenerate gaseous stream. Embodiment 20 is the method of any one of embodiments 1 to 19, wherein at least a portion of the $C_3+$ hydrocarbons are attached to the organosilica particles by absorption.

Embodiment 21 is a method for producing a treated gaseous stream that includes (a) providing a gaseous stream comprising $C_3+$ hydrocarbons to a bed of organosilica particles under conditions sufficient to capture some of the $C_{3+}$ hydrocarbons and to obtain a treated gaseous stream; and (b) regenerating the bed of organosilica particles by (i) providing a heated regenerate stream to the bed of organosilica particles under conditions sufficient to remove at least a portion of the captured $C_{3+}$ hydrocarbons from the organosilica particles; and (ii) introducing a cooled regenerate gaseous stream to the heated bed of organosilica particles. Embodiment 22 is the method of embodiment 21 that includes substantially stopping the gaseous stream in step (a) prior to step (b). Embodiment 23 is the method of any one of embodiments 21 to 22 that includes alternating (a) with (b) as needed to maintain one or more properties of the treated gaseous stream. Embodiment 24 is the method of embodiment 23, wherein the properties includes hydrocarbon dew point, higher heating value, Wobbe Index, methane number, or a combination thereof. Embodiment 25 is the method of embodiment 24, wherein the organosilica particles are positioned in a treatment vessel, and the method further includes removing the organosilica particles from a treatment vessel after step (b) and providing the organosilica particles to a regeneration vessel prior to step (c). Embodiment 26 is the method of any one of embodiments 21 to 25, wherein the conditions in (a) include a temperature of 60° C. or less and a pressure of 0.1 MPa(g) or more. Embodiment 27 is the method of any one of embodiments 21 to 26 that includes obtaining the gaseous stream from a hydrocarbon wellhead, a gas processing unit, or both. Embodiment 28 is the method of any one of embodiments 21 to 27, wherein the captured $C_3+$ hydrocarbons are absorbed and/or absorbed by the organosilica particles. Embodiment 30 is the method of any one of embodiments 21 to 28, wherein the organosilica particles have an average particle size of less than 500 μm, or from 250 to 500 μm. Embodiment 30 is the method of any one of embodiments 21 to 29, wherein the organosilica particles have an average surface area of 18 to 800 $m^2/g$, or from 300 to 500 $m^2/g$. Embodiment 31 is the method of any one of embodiments 21 to 30, wherein the gaseous stream in (a) includes $C_1$, $C_2$, $C_3+$ hydrocarbons and mixtures thereof. Embodiment 32 is the method of any one of embodiments 21 to 31, wherein the treated gaseous stream of (a) includes $C_1$ to $C_3$ hydrocarbons. Embodiment 33 is the method of any one of embodiments 21 to 32, wherein the heated regenerate stream and/or the cooled regenerate gaseous stream include non-hydrocarbon compounds, hydrocarbons, or both. Embodiment 34 is the method of embodiment 33, wherein the heated regenerate stream and/or the cooled regenerate gaseous stream includes hydrocarbons having a carbon number from 1 to 3, from 1 to 2. Embodiment 35 is the method of embodiment 34, wherein the heated regenerate stream is a non-hydrocarbon gaseous stream. Embodiment 36 is the method of embodiment 35, wherein the non-hydrocarbons include nitrogen or inert gas. Embodiment 37 is the method of any one of embodiments 21 to 36, wherein the heated regenerate stream and/or the cooled regenerate stream is derived from the treated gaseous stream in step (a). Embodiment 38 is the method of any one of embodiments 21 to 37, wherein a temperature of the heated regenerate gas is 50° C. or above, 200° C. or above, or 250° C. or above at 1 atm of pressure or above. Embodiment 39 is the method of embodiment 38, wherein the temperature of the heated bed of organosilica particles is 50° C. or above at 1 atm of pressure or above. Embodiment 40 is the method of any one of embodiments 21 to 39, wherein at least 90%, at least 99%, or at least 99.9% of the $C_3+$ hydrocarbons are removed from the organosilica particles. Embodiment 41 is the method of any one of embodiments 21 to 40 that includes repeating steps (i) and (ii) until a majority of the $C_3+$ hydrocarbons are removed from the organosilica particles. Embodiment 42 is the method of embodiment 41, wherein the steps (i) and (ii) are repeated until at least 90%, at least 99%, or at least 99.9% of the $C_3+$ hydrocarbons are removed from the organosilica particles. Embodiment 43 is the method of any one of embodiments 21 to 42, wherein the organosilica bed in (c) is heated by the heated regenerate stream and an additional heat source. Embodiment 44 is the method of embodiment 43, wherein the heated regenerate stream is the only heat source in step (b). Embodiment 45 is the method of any one of embodiments 21 to 44, further comprising collecting the removed $C_3+$ hydrocarbons.

The following includes definitions of various terms and phrases used throughout this specification.

The term "hydrocarbon" includes compounds having carbon and hydrogen and derivatives thereof. A hydrocarbon derivative can include a heteroatom and/or a halogen. Non-limiting examples of heteroatoms include nitrogen, sulfur, oxygen or combinations thereof. Halogens include fluorine, chlorine, bromine and iodine.

The term "capture" when used in the context of capturing hydrocarbons with organosilica particles means that hydrocarbons can be adsorbed or absorbed, or both, on organosilica particles. In particular instances, absorption is the primary mechanism of action.

The term "remove" when used in the context of removing hydrocarbons from organosilica particles means that hydrocarbons can be desorbed from the organosilica particles.

The term "hydrocarbon dew point" refers to a series of matching pressure and temperature points at which hydrocarbons condense into to liquid from a mixture of liquids and gases. At the hydrocarbon dew point the gaseous stream of the present invention can include a gas phase and a liquid phase. The liquid phase can be droplets of liquid.

The term "Wobbe Index" is an indicator of the interchangeability of gases used for fuel. Non-limiting examples of fuel gases include hydrogen, methane, ethane, ethylene, natural gas, propane, propylene, n-butane, i-butane, butylene-1, liquefied petroleum gas, acetylene and carbon monoxide, synthesis gas, and natural gas.

The term "heating value" of a gaseous stream is the amount of heat released during the combustion of a specified amount of the gaseous stream. It is reported as lower and higher heating values. A higher heating value of natural gas is about 52.2 kJ/g (22,453 BTU/lb). A lower heating value of natural gas is 47.14 kJ/g (20,267 BTU/lb).

The term "methane number" is a measure of resistance of a gas fuel to knock. Pure methane has a high knock resistance and is given an index value of 100. Hydrogen has a low knock resistance and has an index value of 0. Methane number can be calculated from the chemical composition of the natural gas. International Standard ISO/TR22302:2014 describes how to calculate methane number of a natural gas.

The term "organosilica" refers to a compound containing silicon, oxygen and hydrocarbon substituents or derivatives thereof, (i.e., Si—O—R, where R is a hydrocarbon substituent or derivative thereof) Hydrocarbon derivatives can include heteroatoms such as nitrogen, sulfur, phosphorus, oxygen, or a halogen.

The terms "about" and "approximately" are defined as being close to as understood by one of ordinary skill in the art, and in one non-limiting embodiment the terms are defined to be within 10%, preferably within 5%, more preferably within 1%, and most preferably within 0.5%.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with the term "comprising" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The methods of the present invention can "comprise," "consist essentially of," or "consist of" particular ingredients, components, compositions, etc. disclosed throughout the specification. With respect to the transitional phase "consisting essentially of," in one non-limiting aspect, a basic and novel characteristic of the methods of the present invention is the ability to hydrocarbons from a gaseous stream based on the partial pressure of the specific hydrocarbons.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings.

Figure 1:
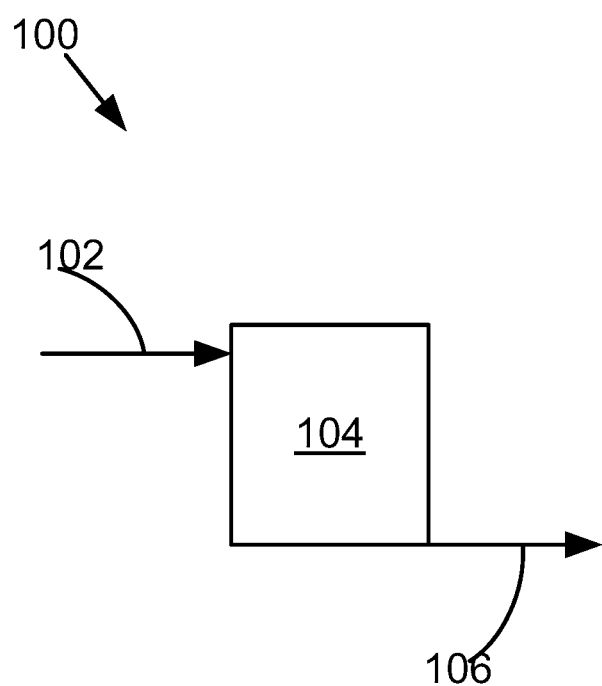
FIG. 1 depicts a schematic of treating a gas stream according to the present invention.

While the invention is susceptible to various modifications and alternative forms, specific embodiments thereof are shown by way of example in the drawings and may herein be described in detail. The drawings may not be to scale.

DETAILED DESCRIPTION OF THE INVENTION

The currently available technologies to remove $C_3+$ hydrocarbons, preferably $C_4+$ hydrocarbons, from a gaseous stream suffer from large footprints, the inability to remove liquid droplets from a vapor phase and/or large energy input or an expenditure of the energy stored in the gas, respectively. Thus, these processes are not always economically viable to implement.

A discovery has been made that solves the problems associated with the currently available technologies to remove "heavy" hydrocarbons from a gaseous stream. Removal of the heavy hydrocarbons can reduce the HCDP of the produced gas, lower the Wobbe Index of the gas, lower the heating value of the gas, and increase the methane number of the gas. Lowering the hydrocarbon dew point value of the gaseous stream can enable production at more wells. As an additional benefit, the effluent stream can be used as instrument gas, which eliminates the need for the utilities and equipment needed to create instrument air.

These and other non-limiting aspects of the present invention are discussed in further detail in the following sections.

A. Gaseous Stream

The gaseous stream can be any gaseous stream that contains hydrocarbons. In a preferred aspect of the invention, the gaseous stream is a natural gas stream. Natural gas is produced from one of three sources: associated gas (gas produced as a by-product of oil production and the oil recovery process), recovered in conjunction with oil production, non-associated gas (gas from a field not producing oil), and from coal seams (coal bed methane). All natural gas is not of the same quality when produced. Each source of natural gas exhibits distinct characteristics and even gas produced from a particular source may vary with the most abundant component being methane. Produced gas can also contain varying quantities of non-methane hydrocarbon (e.g., $C_{2+}$ hydrocarbons) and other non-hydrocarbon gases that contribute little or no heating value. Depending upon the concentrations present, the gas may require treatment to reduce constituents such as water, carbon dioxide, nitrogen, oxygen, total sulfur and hydrogen sulfide. Natural gas that is rich in non-methane hydrocarbon constituents may also be further processed to extract natural gas liquids.

Produced gases can contain hydrocarbons and non-hydrocarbon gases. Hydrocarbon cases are methane ($C_1$), ethane ($C_2$), propane ($C_3$), butanes ($C_4$), pentanes ($C_5$), hexanes ($C_6$), heptanes ($C_7$), octanes ($C_8$), and nonanes plus ($C_{9+}$). The non-hydrocarbon gases can include nitrogen, carbon dioxide, helium, hydrogen sulfide, water vapor, oxygen, other sulfur compounds, and trace gases.

Associated gas is produced as a by-product of oil production and oil recovery process. After the production fluids are brought to the surface, they can be separated into crude oil, water, and a gaseous stream. The gaseous stream can include a significant amount of natural gas liquids (NGLs). NGLs are ethane, propane, butanes, pentanes and higher molecular weight hydrocarbons ($C_{2+}$ hydrocarbons). Associated gas can include 81 vol. % of methane, 5.5 vol. % of ethane, 6.6 vol. % of propane, 4.0 vol. % of butane, 1.4 vol. % of pentane, 1.0 vol. % of nitrogen and 0.17 vol. % of carbon dioxide. Non-associated gas is produced from geological formations that do not contain much, if any, hydrocarbon liquids. Non-associated gas can have a lower NGL content than associate gas. Coal bed methane is found within geological formations of coal deposits. Because coal is a solid, very high carbon content mineral, there are usually little to no liquid hydrocarbons contained in the produced gas. To remove gas from the coal bed, the coal bed can be treated with water to allow the trapped gas to flow through the formation to produce the gas. Coal bed methane has a lower heating value and elevated carbon dioxide, oxygen and water as compared to other produced gases.

A hydrocarbon dew point value of the gaseous streams can be 5° C. or more, 10° C. or more, or 25° C. or more at pressures of 0.1 to 10 MPa, or 5° C., 6° C., 7° C., 8° C., 9° C., 10° C., 11° C., 12° C., 13° C., 14° C., 15° C., 16° C., 17° C., 18° C., 19° C., 20° C., 21° C., 22° C., 23° C., 24° C., 25° C., or values there between at pressures of 0.1 to 10 MPa(g). The hydrocarbon dew point value of the gaseous stream is a function of the composition of the gaseous mixture. As the amount of $C_{4+}$ hydrocarbons, for example, an amount of $C_{6+}$ hydrocarbons, increases the hydrocarbon dew point value of the gaseous stream will increase at a given pressure. The hydrocarbon dew point value of a gaseous stream can be measured using commercially available analyzers. Such analyzers are available from Michell Instruments (USA), Vaisala (Finland), General Electric (USA), ZEGAZ Instruments (USA), and AMTEK (USA). A Wobbe Index value of the gaseous streams can range from 39 to 60 megajoules per normal cubic meters (MJ/Nm³), 39 to 45 MJ/Nm³, 45.5 to 55 MJ/Nm³, or 48 to 53 MJ/Nm³ or ranges there between, or be 39 MJ/Nm³, 40 MJ/Nm³, 41 MJ/Nm³, 42 MJ/Nm³, 43 MJ/Nm³, 44 MJ/Nm³, 45 MJ/Nm³, 46 MJ/Nm³, 47 MJ/Nm³, 48 MJ/Nm³, 49 MJ/Nm³, 50 MJ/Nm³, 51 MJ/Nm³, 52 MJ/Nm³, 53 MJ/Nm³, 54 MJ/Nm³, 55 MJ/Nm³, 56 MJ/Nm³, 57 MJ/Nm³, 58 MJ/Nm³, 59 MJ/Nm³, 60 MJ/Nm³, or values there between. The Wobbe Index value of the gaseous steam can be measured using a commercially available instrumentation. Such instrumentation is available from Cosa+xentaur (USA), Hobre Instruments BV (Netherlands), and Applied Analytics, Inc. (USA). A higher heating value of the gaseous stream can range from 40.7 kJ/g to 52.2 kJ/g (17,500 BTU/lb to 22,453 BTU/lb), 40.8 kJ/g, 40.9 kJ/g, 50.0 kJ/g, 50.1 kJ/g, 50.2 kJ/g, 50.3 kJ/g, 50.4 kJ/g, 50.5 kJ/g, 50.6 kJ/g, 50.7 kJ/g, 50.8 kJ/g, 50.9 kJ/g, 51.0 kJ/g, 51.1 kJ/g, 51.2 kJ/g, 51.3 kJ/g, 51.4 kJ/g, 51.5 kJ/g, 51.6 kJ/g, 51.7 kJ/g, 51.8 kJ/g, 51.9 kJ/g, 52.0 kJ/g, 52.1 kJ/g, 52.2 kJ/g, or values there between. or values there between. The higher heating value of the gaseous steam can be measured using a commercially available instrumentation. Such instrumentation is available from Cosa+xentaur (USA), Hobre Instruments BV (Netherlands), Applied Analytics, Inc. (USA), and Precisive Instruments (USA). A methane number for the gaseous streams described herein can be 5 to 110, 40 to 90, 50 to 70, or any number or range there between. The methane number of a gaseous stream is dependent on the gas composition. Methane numbers can be calculated using ISO Method 15403.

B. Organosilica Particles

The organosilica particles can be a composition obtained through sol-gel synthesis. The sol-gel composition can be prepared by polymerizing bridged silane precursors under acid or base conditions in appropriate solvents. In some instances, the organosilica can be obtained by providing a plurality of interconnected organosilica nanoparticles having residual silanols. The residual silanols can be derivatized using known synthetic methods. The derivatized silanol nanoparticles can be dried to obtain the organosilica particles. In some instances, the organosilica nanoparticles can include particulate material that is capable of binding to or reacting with a non-polar or organic substance. The organosilica particles can capture hydrocarbons through adsorption, absorption, or a combination thereof, with absorption being the primary mechanism of action. The sol-gel composition can be prepared as described in U.S. Pat. Nos. 7,790,830; 8,119,759; and 8,367,793, all of which are incorporated herein by reference in their entirety. The organosilica particles are commercially available and sold under the trade name Osorb® (ABS Materials, Inc. Wooster, Ohio). Without wishing to be bound by theory, it is believed that the organosilica particles captures hydrocarbons by forming a non-binding physical attraction between the organosilica particles and the captured species. Thus, the media can be regenerated for reuse by removing the captured hydrocarbons. Exposure of the organosilica particles to a vapor mixture allows the organosilica particles to capture each individual hydrocarbon in proportion to the partial pressure divided by the saturated vapor pressure of that species; in other words, vapor species "x" is captured in proportion to:

$$\frac{\text{Partial Pressure}_x}{\text{Saturated Vapor Pressure}_x}$$

Since heavier hydrocarbons can have a lower saturated vapor pressure under a given set of conditions, the organosilica particles will preferentially capture these species from a gaseous mixture. Thus, organosilica particles are extremely efficient at capturing any liquid hydrocarbon droplets entrained in the gas stream as demonstrated in Example 1. Thus, for a gaseous stream having a saturated pressure of value y, up to z % of vapor species hydrocarbons are removed at 25° C. and 1 atm. The organosilica particles can capture its capacity of lower molecular weight hydrocarbons, but continue to absorb higher molecular weight hydrocarbons. In a particular instance, the organosilica particles can stop capturing $C_3$ and/or $C_4$ hydrocarbons, but continue to capture pentanes and higher molecular weight hydrocarbons ($C_{5+}$ hydrocarbons). Although the media stops capturing $C_5$ hydrocarbons, it can continue to capturing hexanes and heavier species ($C_{6+}$ hydrocarbons). In addition to having a larger total capacity for hydrocarbons with a higher molecular weight, the organosilica particles also maintain partial capture of these species for a longer time after initial breakthrough. (See, for example, FIG. 7).

C. Gas Treatment Process

Non-limiting examples of method to treat a gaseous stream that contains hydrocarbons is described are provide below with reference to FIGS. 1-4.

FIG. 1 depicts a schematic of a system 100 for treating a gas stream to separate hydrocarbons based on their saturated vapor pressure. Gaseous stream 102 (for example, a natural gas stream) can enter gas treatment unit 104. Gaseous stream 102 can be any gaseous stream described throughout this specification and includes $C_{1-4}+$ hydrocarbons. Gaseous stream can be a natural gas stream from a hydrocarbon formation that has been separated from liquid hydrocarbons and/or water using methods known in the art. For example, gaseous stream 102 may be obtained from a coalescing unit used to reduce condensate in gas streams. Gaseous stream 102 can be at a temperature and pressure to ensure that gaseous stream 102 is above the hydrocarbon dew point value of the stream. Having the temperature above the hydrocarbon dew point ensures that gaseous stream 102 is a single phase (i.e., a gas phase). The temperature of gaseous stream 102 can be 60° C. or less, 5 to 50° C., 15 to 35° C., 20 to 25° C., or any range there between. In some instances, a temperature of gaseous stream 102 can be about 5° C., 6° C., 7° C., 8° C., 9° C., 10° C., 11° C., 12° C., 13° C., 14° C., 15° C., 16° C., 17° C., 18° C., 19° C., 20° C., 21° C., 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C., 50° C., 51° C., 52° C., 53° C., 54° C., 55° C., 56° C., 57° C., 58° C., 59° C., 60° C., or any value there between. A pressure of gaseous stream can be 10 MPa or from 0.2 to 7.9 MPa, from 0.6 to 4.5 MPa, or from 2.8 to 4.1 MPa, or any range there between. Pressures referred to herein are gauge pressures, however, it should be understood that the pressures can be reported as absolute pressures. In some instances, the pressure of gaseous stream 102 can be about 0.1 MPa, 0.2 MPa, 0.3 MPa, 0.4 MPa, 0.5 MPa, 0.6 MPa, 0.7 MPa, 0.8 MPa, 0.9 MPa, 1.0 MPa, 1.1 MPa, 1.2 MPa, 1.3 MPa, 1.4 MPa, 1.5 MPa, 1.6 MPa, 1.7 MPa, 1.8 MPa, 1.9 MPa, 2.0 MPa, 2.1 MPa, 2.2 MPa, 2.3 MPa, 2.4 MPa, 2.5 MPa, 2.6 MPa, 2.7 MPa, 2.8 MPa, 2.9 MPa, 3.0 MPa, 3.1 MPa, 3.2 MPa, 3.3 MPa, 3.4 MPa, 3.6 MPa, 3.7 MPa, 3.8 MPa, 3.9 MPa, 4.0 MPa, 4.1 MPa, 4.2 MPa, 4.3 MPa, 4.4 MPa, 4.5 MPa, 4.6 MPa, 4.7 MPa, 4.8 MPa, 4.9 MPa, 5.0 MPa, 5.1 MPa, 5.2 MPa, 5.3 MPa, 5.5 MPa, 5.6 MPa, 5.7 MPa, 5.8 MPa, 5.9 MPa, 6.0 MPa, 6.1 MPa, 6.2 MPa, 6.3 MPa, 6.4 MPa, 6.5 MPa, 6.6 MPa, 6.7 MPa, 6.8 MPa, 6.9 MPa, 7.0 MPa, 7.1 MPa, 7.2 MPa, 7.3 MPa, 7.4 MPa, 7.5 MPa, 7.6 MPa, 7.8 MPa, 7.9 MPa, 8.0 MPa, 8.1 MPa, 8.2 MPa, 8.3 MPa, 8.4 MPa, 8.5 MPa, 8.6 MPa, 8.7 MPa, 8.8 MPa, 8.9 MPa, 9.0 MPa, 10.0 MPa, or any value there between. The flow of the gaseous stream can be regulated by one or more valves. The flow can be adjusted to maximize contact of the gaseous stream with the organosilica particles. A gas hourly space velocity can be from 0.1 $h^{-1}$ to 10,000 $h^{-1}$, from 1 $h^{-1}$ to 1,000 $h^{-1}$, from 2 $h^{-1}$ to 500 $h^{-1}$, or ranges there between. Gas treatment unit 104 can be equipped with heating devices, temperature control devices, pressure regulators, pressurizing equipment to control the pressure and temperature of gaseous stream 102 to maintain the stream in a gas phase as it enters the treatment unit, during processing and upon exiting the unit. Gas treatment unit 104 can be of dimensions suitable to hold the organosilica particles. In gas treatment unit 104, gaseous stream 102 contacts the organosilica particles such that $C_3+$ hydrocarbons or $C_4+$ hydrocarbons in the gaseous stream are captured to form treated gaseous stream 106. In some instances, little or no $C_3$ hydrocarbons are captured. Gas treatment unit 104 may be portable, skid mounted, or a permanent vessel that is coupled to gas processing equipment and/or a hydrocarbon wellhead. Gas treatment unit 104 can be filled with organosilica particles and transported to the site. In some instances, gas treatment unit 104 has openings that allow the organosilica to be added or removed as needed. Such openings can be sealed so that the gas treatment unit (vessel) can be pressurized. As shown in FIG. 1, gaseous stream 102 enters treatment unit 104 at the top of the unit and flows in downwardly direction through bed of organosilica particle, and then exits the treatment unit at the bottom of the unit as treated gaseous stream 106. In other embodiments, gaseous stream 102 can flow in an upwardly direction (e.g., enter through the bottom) through the bed of particles, or flow in a horizontal direction through bed of organosilica particles the treatment unit. Treated gaseous stream 106 exist gas treatment unit 104 at the bottom of the vessel. In some aspects, a particulate filter is added at the exit point of the gas treatment unit to capture any fine media particles that have been carried through process. Treated gas stream 106 may meet industry specifications for natural gas pipelines, energy equipment, and/or be suitable for sale. Treated gaseous stream 106 can be provided to a pipeline (for example, a sales pipeline), transportation units, gas processing units, storage units, and the like, or be used as fuel or instrument air.

Figure 2A:
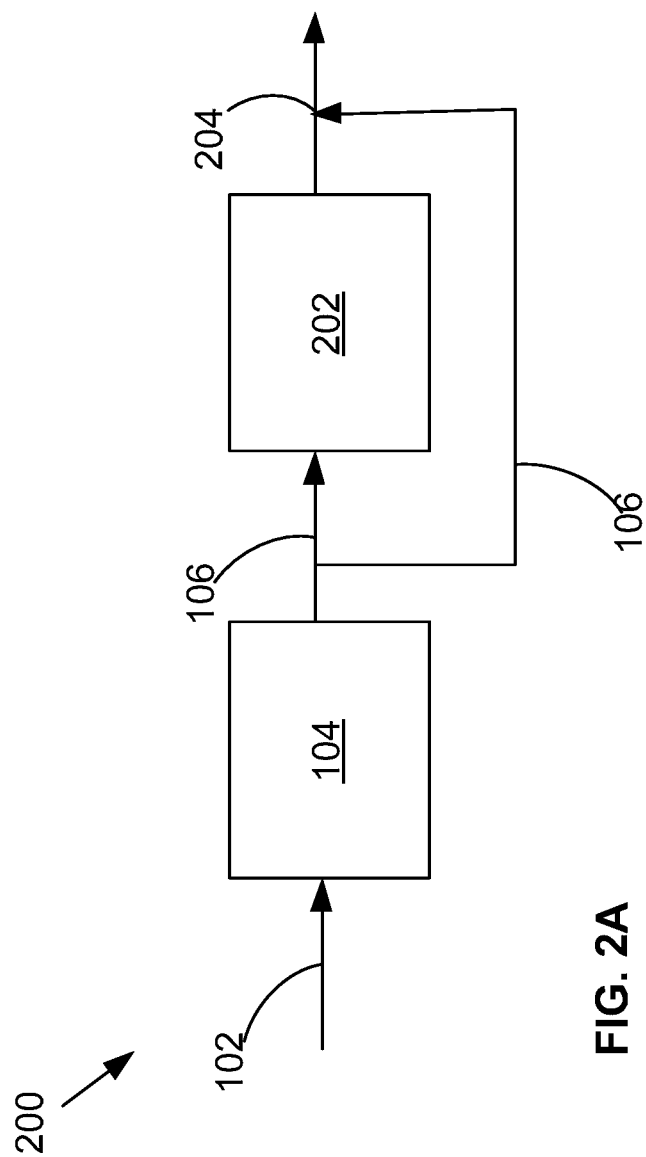
FIGS. 2A and 2B depict schematics of treating a gas stream according to the present invention using a series of gas treatment units.
Figure 2B:
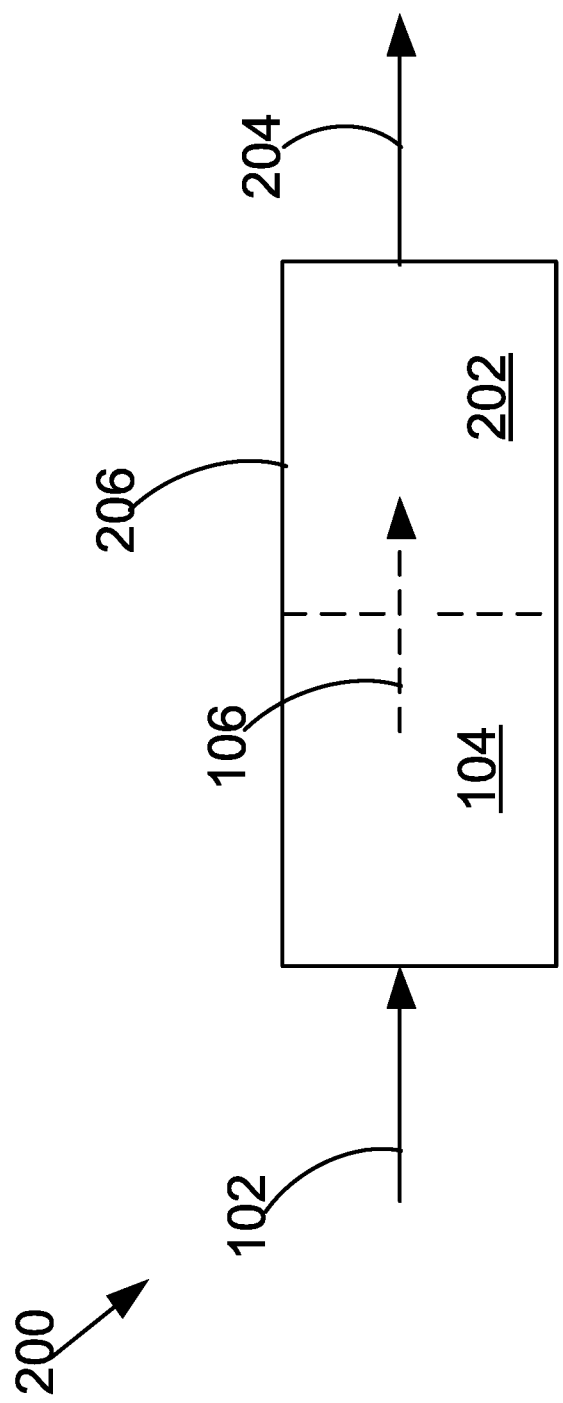

In some embodiments, a portion of the treated gas stream 106 may be further treated to meet certain industry, pipeline or transportation specifications. FIG. 2A depicts a schematic of a system 200 for a treated gaseous stream 106 being further treated. As shown in FIG. 2A, treated gaseous stream 106 enters second gas treatment unit 202. In gas treatment unit 202, treated gaseous stream 106 is contacted with organosilica particles to capture hydrocarbons as described throughout the specification to produce treated gaseous stream 204. While gas treatment unit 202 is shown as a separate unit than gas treatment unit 106, the two treatment units can be two zones or two beds in housing 206 as shown in the schematic of a system 200 in FIG. 2B. Treated gaseous stream 204 will have lower amounts of $C_3+$ hydrocarbons than treated steam 106. A portion of treated gaseous stream 106 can be combined with treated gaseous stream 204. In some instances, treated gaseous stream 106 is not combined with treated gaseous stream 204. Treated gas stream 204 and/or the combined treated gaseous stream may meet industry specifications for natural gas pipelines, energy equipment, and/or be suitable for sale. Treated gaseous stream 204 and/or the combined treated gaseous stream can be provided to a pipeline, transportation units, gas processing units, storage units, and the like, or be used as fuel or instrument air.

Figure 3:
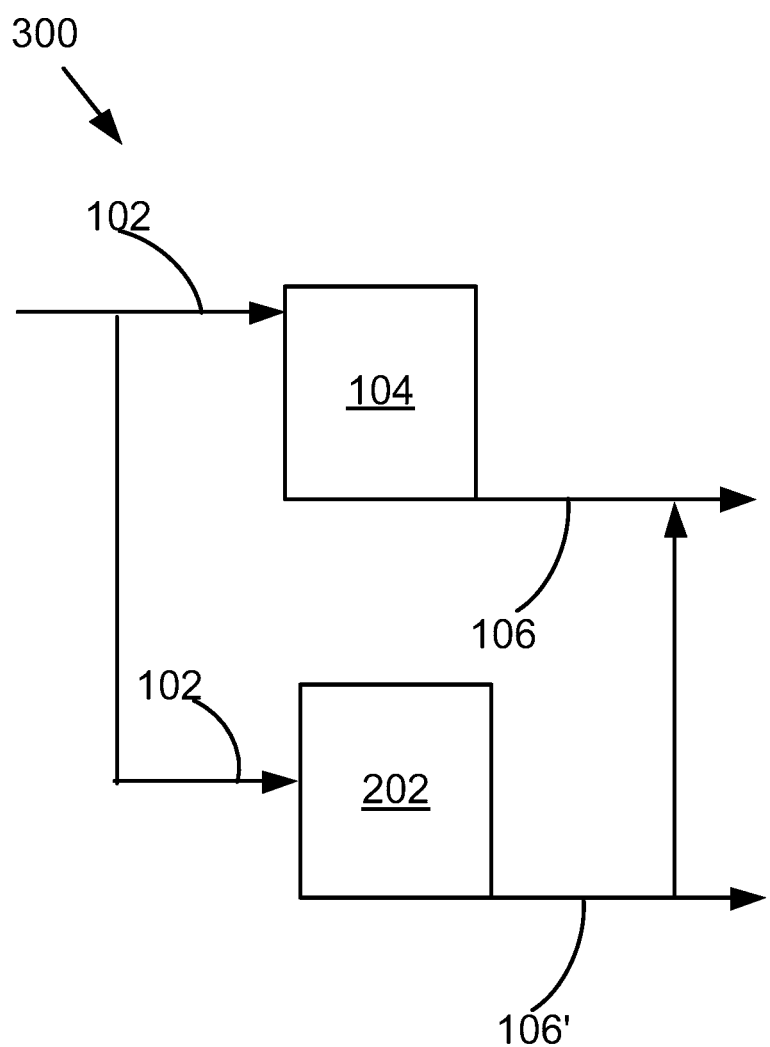
FIG. 3 depicts a schematic of treating a gas stream according to the present invention using gas treatment units in parallel.

In some aspects of the invention, treatment units 104 and 202 are arranged in a parallel configuration and portions of gaseous stream 102 is provided to each unit. Such a configuration may be useful for facilities that have small area for placement of the treatment units. FIG. 3 depicts a schematic of a system 300 for treating a gaseous stream using two treatment units. A portion of gaseous stream 102 may enter gas treatments units 104 and 202. In treatment units 104 and 202, gaseous stream 102 is contacted with organosilica particles to remove $C_{3+}$ hydrocarbons and produce treated gaseous streams 106, 106'. Treated gaseous stream 106, 106' can exit treatment units 104, 202, respectively. A portion of treated gaseous stream 106' can be combined with treated gaseous stream 106 or vice versa. Treated gaseous streams 106, 106' can be further treated as described in FIG. 2B and/or provided to a pipeline, transportation units, gas processing units, storage units, and the like, or be used as fuel or instrument air.

Figure 4:
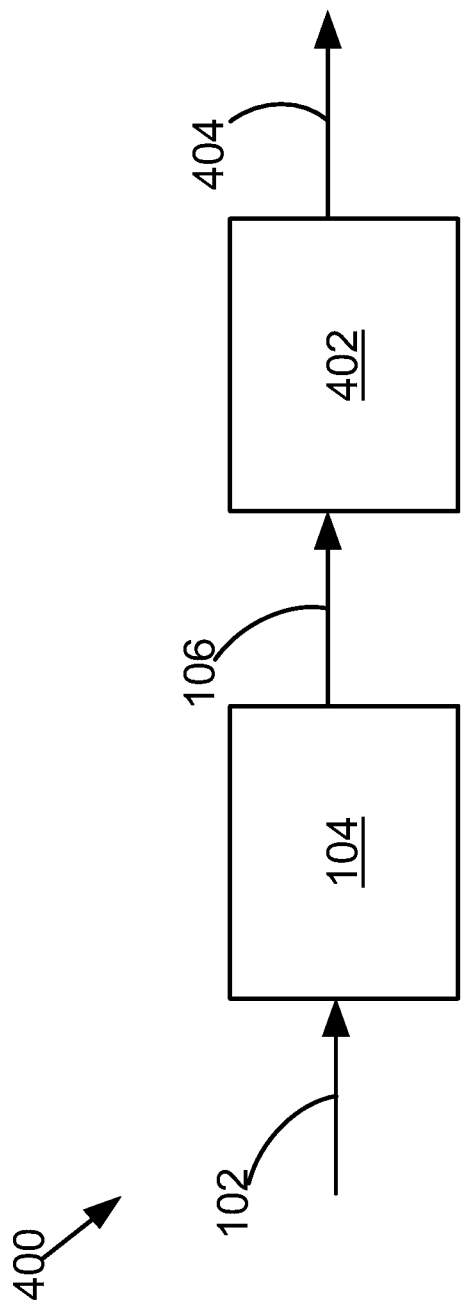
FIG. 4 depicts a schematic of treating a gas stream according to the present invention using a gas treatment unit and a gas purification unit.

In some aspects of the invention, the treated gaseous streams 106, 106' and/or 204 can be provided to a membrane unit. FIG. 4 depicts a schematic of a system 400 containing the gas treatment unit 104 and a gas purification unit 402. As described in FIGS. 1-3, gaseous stream 102 enters gas treatment unit 104, contacts the organosilica particles in the gas treatment unit to produce treated gas stream 106. Treated gas stream 106 can enter gas purification unit 402. Gas purification unit 402 can be a membrane unit, an amine system, or any system capable of removing non-hydrocarbon compounds such as hydrogen sulfide, carbon oxides, nitrogen or other containments. Removal of $C_3+$ hydrocarbons can eliminate plugging of the membrane and/or increase the life of carbon bed filters used in the amine purification process. If the level of contaminants is sufficient low, gas purification unit can be a cryogenic gas separation unit. In purification unit 402, treated gas stream is subject to conditions sufficient to remove the unwanted components from the gas stream to produce purified gaseous stream 404. Purified gaseous stream 404 can exit purification unit 402 and can be used as fuel and/or instrument air, can be sold, stored, or transported. In some embodiments, the purified gas stream and/or treated gas streams are provided to one or more gas separation units and the purified gas stream is treated to recover natural gas liquids using known gas separation methods (e.g., cryogenic separation).

C. Treated Gaseous Streams

The treated gaseous streams described throughout the specification (for example, treated gaseous streams 106, 106', 204 and combinations thereof) can meet the industry specifications for natural gas pipelines, energy equipment, and/or be suitable for sale. The treated gaseous stream can include $C_{1-4}$ hydrocarbons and non-hydrocarbon compounds, $C_{1-3}$ hydrocarbons and non-hydrocarbon compounds, $C_{1-2}$ hydrocarbons and non-hydrocarbon compounds. The amount of $C_{1-2}$ hydrocarbons and non-hydrocarbons in the treated gaseous stream can be less than the amount of non-hydrocarbons in the untreated gaseous stream, however, this change can be minimal. Any loss or difference in amounts can be attributed to processing losses. Said another way, $C_{1-2}$ hydrocarbons and non-hydrocarbons are not significantly removed at the pressures and temperatures used in this process. The treated hydrocarbon stream can have at least 1 mol %, at least 5 mol %, at least 10 mol %, or at least 99 mol %, or 10 to 99.9 mol %, 20 to 80%, or 30 to 50% of the $C_{3+}$ hydrocarbons removed as determined using standard gas composition analysis methods (for example, gas chromatograph in combination with mass spectrometry (GCMS). In some instances, substantially all of $C_3+$ hydrocarbons are removed. In some embodiments, the treated gas stream includes $C_3$ hydrocarbons (propane or propene) with the balance being $C_{1-2}$ hydrocarbons and non-hydrocarbons. A total mole percentage of $C_3$ hydrocarbons (propane or propene) remaining in the treated gaseous stream can be 0.0001%, 0.0002%, 0.0003%, 0.0004%, 0.0005%, 0.0006%, 0.0007%, 0.0008%, 0.0009%, 0.0010%, 0.0011%, 0.0012%, 0.0013%, 0.0014%, 0.0015%, 0.0016%, 0.0017%, 0.0018%, 0.0019%, 0.0020%, 0.0021%, 0.0022%, 0.0023%, 0.0024%, 0.0025%, 0.0026%, 0.0027%, 0.0028%, 0.0029%, 0.0030%, 0.0031%, 0.0032%, 0.0033%, 0.0034%, 0.0035%, 0.0036%, 0.0037%, 0.0038%, 0.0039%, 0.0040%, 0.0041%, 0.0042%, 0.0043%, 0.0044%, 0.0045%, 0.0046%, 0.0047%, 0.0048%, 0.0049%, 0.0050%, 0.0051%, 0.0052%, 0.0053%, 0.0054%, 0.0055%, 0.0056%, 0.0057%, 0.0058%, 0.0059%, 0.0060%, 0.0061%, 0.0062%, 0.0063%, 0.0064%, 0.0065%, 0.0066%, 0.0067%, 0.0068%, 0.0069%, 0.0070%, 0.0071%, 0.0072%, 0.0073%, 0.0074%, 0.0075%, 0.0076%, 0.0077%, 0.0078%, 0.0079%, 0.0080%, 0.0081%, 0.0082%, 0.0083%, 0.0084%, 0.0085%, 0.0086%, 0.0087%, 0.0088%, 0.0089%, 0.0090%, 0.0091%, 0.0092%, 0.0093%, 0.0094%, 0.0095%, 0.0096%, 0.0097%, 0.0098%, 0.0099%, 0.0100%, 0.0200%, 0.0250%, 0.0275%, 0.0300%, 0.0325%, 0.0350%, 0.0375%, 0.0400%, 0.0425%, 0.0450%, 0.0475%, 0.0500%, 0.0525%, 0.0550%, 0.0575%, 0.0600%, 0.0625%, 0.0650%, 0.0675%, 0.0700%, 0.0725%, 0.0750%, 0.0775%, 0.0800%, 0.0825%, 0.0850%, 0.0875%, 0.0900%, 0.0925%, 0.0950%, 0.0975%, 0.1000%, 0.1250%, 0.1500%, 0.1750%, 0.2000%, 0.2250%, 0.2500%, 0.2750%, 0.3000%, 0.3250%, 0.3500%, 0.3750%, 0.4000%, 0.4250%, 0.4500%, 0.4750%, 0.5000%, 0.5250%, 0.550%, 0.5750%, 0.6000%, 0.6250%, 0.6500%, 0.6750%, 0.7000%, 0.7250%, 0.7500%, 0.7750%, 0.8000%, 0.8250%, 0.8500%, 0.8750%, 0.9000%, 0.9250%, 0.9500%, 0.9750%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, 8.0%, 8.1%, 8.2%, 8.3%, 8.4%, 8.5%, 8.6%, 8.7%, 8.8%, 8.9%, 9.0%, 9.1%, 9.2%, 9.3%, 9.4%, 9.5%, 9.6%, 9.7%, 9.8%, 9.9%, 10%, 11%, 12%, 13%, 14%, 15%, 16%, 17%, 18%, 19%, 20%, 21%, 22%, 23%, 24%, 25%, 26%, 27%, 28%, 29%, 30%, 35%, 40%, 45%, 50%, 60%, 65%, 70%, 75%, 80%, 85%, 90%, 95%, 99%, or any value there between.

In some embodiments, the treated gas stream can include $C_4$ hydrocarbons with the balance being $C_{1-3}$ hydrocarbons and non-hydrocarbon compounds. A total mole percentage of $C_4$ hydrocarbons remaining in the treated gaseous stream can be 0.0001%, 0.0002%, 0.0003%, 0.0004%, 0.0005%, 0.0006%, 0.0007%, 0.0008%, 0.0009%, 0.0010%, 0.0011%, 0.0012%, 0.0013%, 0.0014%, 0.0015%, 0.0016%, 0.0017%, 0.0018%, 0.0019%, 0.0020%, 0.0021%, 0.0022%, 0.0023%, 0.0024%, 0.0025%, 0.0026%, 0.0027%, 0.0028%, 0.0029%, 0.0030%, 0.0031%, 0.0032%, 0.0033%, 0.0034%, 0.0035%, 0.0036%, 0.0037%, 0.0038%, 0.0039%, 0.0040%, 0.0041%, 0.0042%, 0.0043%, 0.0044%, 0.0045%, 0.0046%, 0.0047%, 0.0048%, 0.0049%, 0.0050%, 0.0051%, 0.0052%, 0.0053%, 0.0054%, 0.0055%, 0.0056%, 0.0057%, 0.0058%, 0.0059%, 0.0060%, 0.0061%, 0.0062%, 0.0063%, 0.0064%, 0.0065%, 0.0066%, 0.0067%, 0.0068%, 0.0069%, 0.0070%, 0.0071%, 0.0072%, 0.0073%, 0.0074%, 0.0075%, 0.0076%, 0.0077%, 0.0078%, 0.0079%, 0.0080%, 0.0081%, 0.0082%, 0.0083%, 0.0084%, 0.0085%, 0.0086%, 0.0087%, 0.0088%, 0.0089%, 0.0090%, 0.0091%, 0.0092%, 0.0093%, 0.0094%, 0.0095%, 0.0096%, 0.0097%, 0.0098%, 0.0099%, 0.0100%, 0.0200%, 0.0250%, 0.0275%, 0.0300%, 0.0325%, 0.0350%, 0.0375%, 0.0400%, 0.0425%, 0.0450%, 0.0475%, 0.0500%, 0.0525%, 0.0550%, 0.0575%, 0.0600%, 0.0625%, 0.0650%, 0.0675%, 0.0700%, 0.0725%, 0.0750%, 0.0775%, 0.0800%, 0.0825%, 0.0850%, 0.0875%, 0.0900%, 0.0925%, 0.0950%, 0.0975%, 0.1000%, 0.1250%, 0.1500%, 0.1750%, 0.2000%, 0.2250%, 0.2500%, 0.2750%, 0.3000%, 0.3250%, 0.3500%, 0.3750%, 0.4000%, 0.4250%, 0.4500%, 0.4750%, 0.5000%, 0.5250%, 0.550%, 0.5750%, 0.6000%, 0.6250%, 0.6500%, 0.6750%, 0.7000%, 0.7250%, 0.7500%, 0.7750%, 0.8000%, 0.8250%, 0.8500%, 0.8750%, 0.9000%, 0.9250%, 0.9500%, 0.9750%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 10%, 25% or any value there between.

The treated gaseous streams (for example, treated gaseous stream 106) can have a lower hydrocarbon dew point than the gaseous stream 102 at the same temperature and pressure. The hydrocarbon dew point value of the treated gaseous steam can be at least 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, 8.0%, 8.1%, 8.2%, 8.3%, 8.4%, 8.5%, 8.6%, 8.7%, 8.8%, 8.9%, 9.0%, 9.1%, 9.2%, 9.3%, 9.4%, 9.5%, 9.6%, 9.7%, 9.8%, 9.9%, 10%, 11%, 12%, 13%, 14%, 15%, 16%, 17%, 18%, 19%, 20%, 21%, 22%, 23%, 24%, 25%, 26%, 27%, 28%, 29%, 30%, 35%, 40%, 45%, 50%, 60%, 65%, 70%, 75%, 80%, 85%, 90%, 95%, 99%, or any value there between, lower than the hydrocarbon dew point value of the gaseous stream prior to contact with the organosilica particles. The hydrocarbon dew point value of the treated gaseous streams can be −50° C. or less, −5° C. or less, 0° C. or less, at pressures of 0.1 to 10 MPa, or range from −150 to −50° C., −40 to −5° C., −4 to 0° C., or ranges there between at pressures of 0.1 to 10 MPa, or be −150° C., −140° C., −130° C., −120° C., −110° C., −105° C., −100° C., −90° C., −80° C., −70° C., −60° C., −50° C., −40° C., −30° C., −20° C., −19° C., −18° C., −17° C., −16° C., −15° C., −14° C., −13° C., −12° C., −11° C., −10° C., −9° C., −8° C., −7° C., −6° C., −5° C., −4° C., −3° C., −2° C., −1° C., 0° C., 1° C., 2° C., 3° C., 4° C., 5° C., or values there between at pressures of 0.1 to 10 MPa.

A Wobbe Index value of the treated gaseous streams can be lower than the gaseous streams. The Wobbe Index of the treated gaseous steam can at least 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, 8.0%, 8.1%, 8.2%, 8.3%, 8.4%, 8.5%, 8.6%, 8.7%, 8.8%, 8.9%, 9.0%, 9.1%, 9.2%, 9.3%, 9.4%, 9.5%, 9.6%, 9.7%, 9.8%, 9.9%, 10%, 11%, 12%, 13%, 14%, 15%, 16%, 17%, 18%, 19%, 20%, 21%, 22%, 23%, 24%, 25%, 26%, 27%, 28%, 29%, 30%, 35%, 40%, 45%, 50%, 60%, 65%, 70%, 75%, 80%, 85%, 90%, 95%, 99%, or any value there between, lower than the Wobbe Index value of the gaseous stream prior to contact with the organosilica particles. The Wobbe Index value can range from 39 to 60 mega joules per normal cubic meters (MJ/Nm$^3$), 39 to 45 MJ/Nm$^3$, 45.5 to 55 MJ/Nm$^3$, or 48 to 53 MJ/Nm$^3$ or ranges there between, or be 39 MJ/Nm$^3$, 40 MJ/Nm$^3$, 41 MJ/Nm$^3$, 42 MJ/Nm$^3$, 43 MJ/Nm$^3$, 44 MJ/Nm$^3$, 45 MJ/Nm$^3$, 46 MJ/Nm$^3$, 47 MJ/Nm$^3$, 48 MJ/Nm$^3$, 49 MJ/Nm$^3$, 50 MJ/Nm$^3$, 51 MJ/Nm$^3$, 52 MJ/Nm$^3$, 53 MJ/Nm$^3$, or values there between.

A higher heating value of the treated gaseous stream can be at least 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, 8.0%, 8.1%, 8.2%, 8.3%, 8.4%, 8.5%, 8.6%, 8.7%, 8.8%, 8.9%, 9.0%, 9.1%, 9.2%, 9.3%, 9.4%, 9.5%, 9.6%, 9.7%, 9.8%, 9.9%, 10%, 11%, 12%, 13%, 14%, 15%, 16%, 17%, 18%, 19%, 20%, 21%, 22%, 23%, 24%, 25%, 26%, 27%, 28%, 29%, 30%, 35%, 40%, 45%, 50%, 60%, 65%, 70%, 75%, 80%, 85%, 90%, 95%, 99%, or any value there between, lower than the higher heating value of the gaseous stream prior to contact with the organosilica particle. The higher heating value can range from 20.0 kJ/g to 49.5 kJ/g (17,500 BTU/lb to 22,770 BTU/lb), or be 20.1 kJ/g, 20.2 kJ/g, 20.3 kJ/g, 20.4 kJ/g, 20.5 kJ/g, 20.6 kJ/g, 20.7 kJ/g, 20.8 kJ/g, 20.9 kJ/g, 30.0 kJ/g, 30.1 kJ/g, 30.2 kJ/g, 30.3, kJ/g 30.4 kJ/g, 30.5 kJ/g, 30.6 kJ/g, 30.7 kJ/g, 30.8 kJ/g, 30.9 kJ/g, 40.0 kJ/g, 40.1 kJ/g, 40.2, kJ/g, 40.3 kJ/g, 40.4 kJ/g, 40.5 kJ/g, 40.6 kJ/g, 40.7 kJ/g 40.8 kJ/g, 40.9 kJ/g, 41.0 kJ/g, 41.2 kJ/g, 41.3 kJ/g, 41.4 kJ/g, 41.5 kJ/g, 41.6 kJ/g, 41.7 kJ/g, 41.8 kJ/g, 41.9 kJ/g, 42.0 kJ/g, 42.2 kJ/g, 42.3 kJ/g, 42.4 kJ/g, 42.5 kJ/g, 42.6 kJ/g, 42.7 kJ/g, 42.8 kJ/g, 42.9 kJ/g, 43.0 kJ/g, 43.2 kJ/g, 43.3 kJ/g, 43.4 kJ/g, 43.5 kJ/g, 43.6 kJ/g, 43.7 kJ/g, 43.8 kJ/g, 43.9 kJ/g, 44.0 kJ/g, 44.2 kJ/g, 44.3 kJ/g, 44.4 kJ/g, 44.5 kJ/g, 44.6 kJ/g, 44.7 kJ/g, 44.8 kJ/g, 44.9 kJ/g, 45.0 kJ/g, 45.2 kJ/g, 45.3 kJ/g, 45.4 kJ/g, 45.5 kJ/g, 45.6 kJ/g, 45.7 kJ/g, 45.8 kJ/g, 45.9 kJ/g, 46.0 kJ/g, 46.2 kJ/g, 46.3 kJ/g, 46.4 kJ/g, 46.5 kJ/g, 46.6 kJ/g, 46.7 kJ/g, 46.8 kJ/g, 46.9 kJ/g, 47.0 kJ/g, 47.2 kJ/g, 47.3 kJ/g, 47.4 kJ/g, 47.5 kJ/g, 47.6 kJ/g, 47.7 kJ/g, 47.8 kJ/g, 47.9 kJ/g, 48.0 kJ/g, 48.2 kJ/g, 48.3 kJ/g, 48.4 kJ/g, 48.5 kJ/g, 48.6 kJ/g, 48.7 kJ/g, 47.8 kJ/g, 48.9 kJ/g, 49.0 kJ/g, 49.2 kJ/g, 49.3 kJ/g, 49.4 kJ/g, 49.5 kJ/g, or values there between.

A methane number for the treated gaseous streams described herein can be at least 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, 8.0%, 8.1%, 8.2%, 8.3%, 8.4%, 8.5%, 8.6%, 8.7%, 8.8%, 8.9%, 9.0%, 9.1%, 9.2%, 9.3%, 9.4%, 9.5%, 9.6%, 9.7%, 9.8%, 9.9%, 10%, 11%, 12%, 13%, 14%, 15%, 16%, 17%, 18%, 19%, 20%, 21%, 22%, 23%, 24%, 25%, 26%, 27%, 28%, 29%, 30%, 35%, 40%, 45%, 50%, 60%, 65%, 70%, 75%, 80%, 85%, 90%, 95%, 99%, or any value there between, lower than the methane number of the gaseous stream prior to contact with the organosilica particles. The methane number for the treated gaseous stream can be 4 to 109, 40 to 90, 50 to 70, or any number or range there between. A methane number of 80 or more is preferred. Methane numbers can be calculated using ISO Method 15403.

D. Regeneration of Organosilica Particles

Figure 5A:
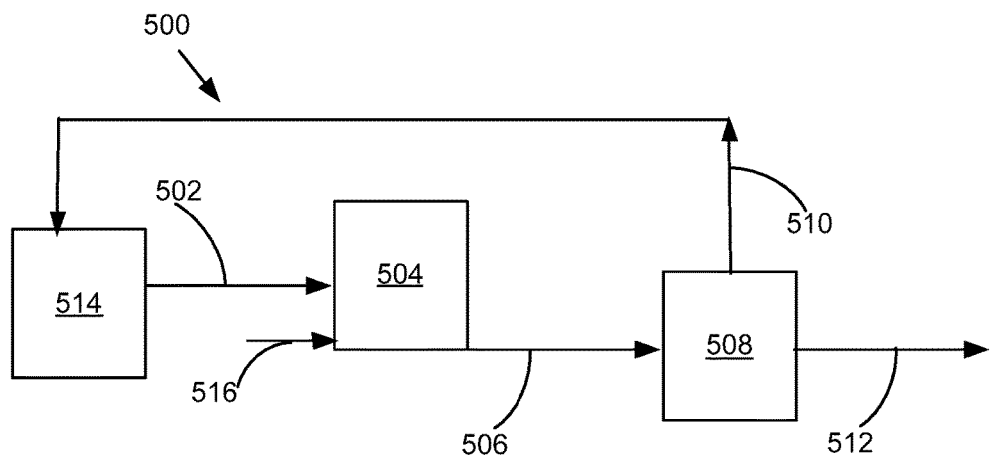
FIGS. 5A and 5B depict schematics of embodiments of regeneration of organosilica particles.
Figure 5B:
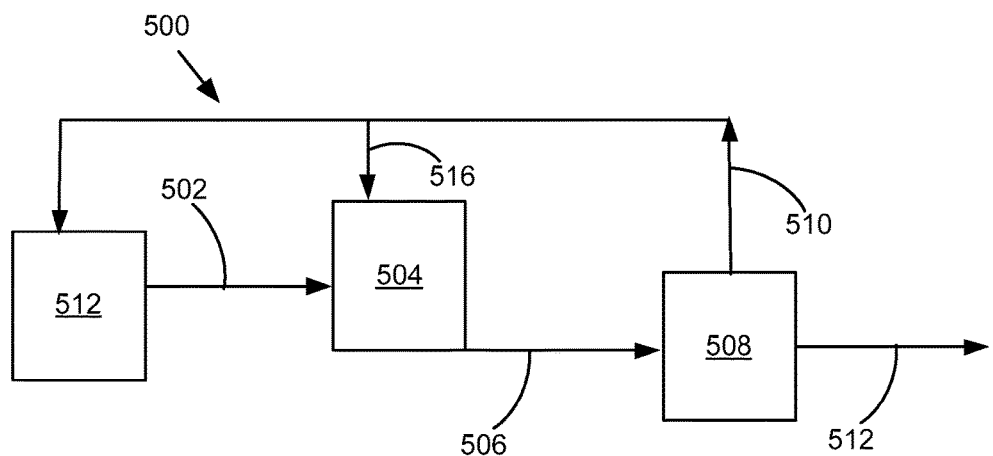
Figure 6:
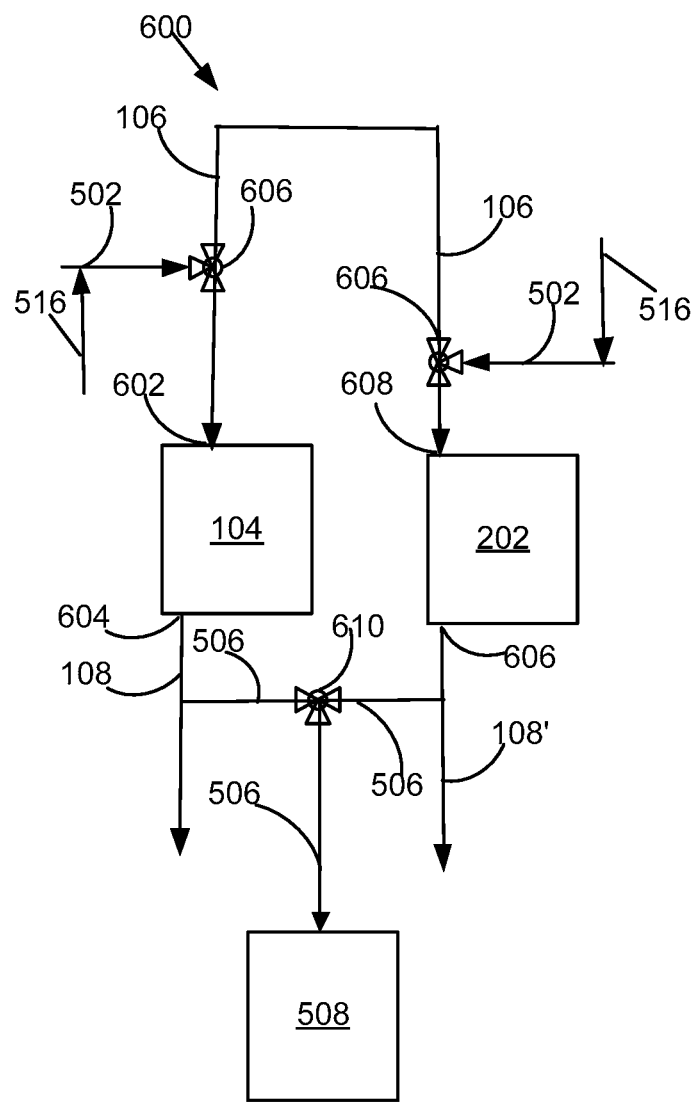
FIG. 6 is a schematic of an embodiment of treatment of a gaseous stream in combination with regeneration of the organosilica particles.

Non-limiting examples of method to treat a gaseous stream that contains hydrocarbons is described are provide below with reference to FIGS. 5 and 6.

The organosilica particles can be regenerated as part of the gaseous treatment process or as a separate process from the gas treatment site or facility. For example, the organosilica particles may be removed from the treatment vessel and regenerated at a remote location. Referring to FIGS. 5A and 5B, methods and systems for the regeneration of organosilica particles are described. In system 500, heated regenerate steam 502 can enter regeneration vessel 504. Regenerate steam 502 can be heated using known heating methods to heat gases such as heaters, heat exchangers, heating coils, or the like. Regenerate stream can be the regenerate streams described throughout this specification. In some aspects, regenerate gas is a stream that has been diverted from the treated gaseous streams described in FIGS. 1-3, nitrogen, inert gas, or mixtures thereof. Regeneration vessel can be a separate regeneration vessel that organosilica particles from one or more regeneration processes or treatment units 104 and/or 202. Heated regenerate stream 502 can be at a temperature of 50° C. or above, 200° C. or above, or 250° C. The temperature of heated regenerate stream can range from 50 to 350° C., 60 to 250° C., 70 to 200° C., 80 to 100° C. or any range there between, or be 50° C., 55° C., 60° C., 65° C., 70° C., 75° C., 80° C., 85° C., 90° C., 95° C., 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C., 200° C., 205° C., 210° C., 215° C., 220° C., 225° C., 230° C., 235° C., 240° C., 245° C., 250° C., 255° C., 260° C., 265° C., 270° C., 275° C., 280° C., 285° C., 290° C., 295° C., 300° C., 305° C., 310° C., 315° C., 320° C., 325° C., 330° C., 335° C., 340° C., 345° C., 350° C., or any number there between. In a preferred aspect, the temperature of the heated regenerate stream is about 250° C. Without wishing to be bound by theory, it is believed that the temperature of the regenerate stream is high enough to heat the organosilica particles to a temperature sufficient to create a concentration gradient and/or shift the equilibrium between the species on the organosilica particle surface towards the gas phase. In some embodiments, regeneration unit 504 is heated. For example, regeneration unit 504 can include a heater, internal coils for circulation of heat exchange fluid through the media, or the like. Heat exchange fluid can include gases and/or liquids. Non-limiting examples of heat exchange fluids include hydrocarbonaceous gases, nitrogen, steam, water, motor oil, hydrocarbon oil.

Heated regeneration stream 502 can flow through regeneration unit 504 in a direction that is concurrent or counter current to the flow of a fluid (for example, gaseous stream 102) that had previously contacted the organosilica particles The heated regeneration stream can exit regeneration unit 504 as hydrocarbon containing stream 506 and pass through one or more collection units 508. Heating of the organosilica particles with heated regeneration stream 502 removes a portion of the captured hydrocarbons from organosilica particles (for example, the hydrocarbons having a lower vapor pressure ($C_3$, $C_4$, $C_5$, $C_6$, $C_7$, $C_8$, $C_9$ or mixtures thereof). Collection unit 508 can include one or more cooling and collection apparatus. In collection unit 508, stream 506 is further cooled to condense $C_{3+}$ hydrocarbons from the stream and form cooled stream 510 and liquid hydrocarbon stream 512. Liquid hydrocarbon stream 512 can include $C_{3+}$ hydrocarbons and some $C_{1-2}$ hydrocarbons. Liquid hydrocarbon stream 512 can be further processed to produce natural gas liquids, or other hydrocarbon products. Cooled gaseous stream 510 can include non-hydrocarbon gases and $C_{1-2}$ hydrocarbon gases, or both. Cooled gaseous stream 510 can be provided to heater unit 514, combined with heated regenerate stream 502, be used a cooled regenerate stream 516 (See, for example FIG. 5B), or combinations thereof to continue the cycle. Cooled regenerate stream 516 can be provided to regeneration unit 504 after the bed of organosilica particles has been heated to the desired temperature and flow of heated regenerate stream 502 has been discontinued or slowed. Cooled regenerate stream 516 cools the organosilica particles and continues to continue to remove the $C_{3+}$ hydrocarbons and/or inhibit the $C_{3+}$ hydrocarbons from being captured by the cooled organosilica particles. Cooled regenerate stream 516 can exit regeneration unit 504 as hydrocarbon containing stream 506 and enter collection unit 508 where any remaining $C_{3+}$ hydrocarbons are condensed and collected from the stream as previously described. Cooled regenerate stream 516 can be gaseous non-hydrocarbons, gaseous hydrocarbon, or both. The regenerated organosilica particles can be removed from regeneration unit 504 and be provided to treatment unit 104 or 202. In some embodiments, regeneration unit 504 and treatment units 104, 202 are the same unit and a gaseous stream is provided to the regeneration unit 504 and is contacted with the regenerated organosilica particles to remove $C_{3+}$ hydrocarbons as described throughout the specification.

In some embodiments, heated regenerate stream 502 flows through coils embedded in the bed of organosilica particles and heat is transferred from the coils to the organosilica particles. Heated regenerate stream can be in a liquid or gas phase. Such heating removes the captured hydrocarbons from the organosilica particles. During the heating, cooled regenerate stream can flow through the regeneration unit 504 and entrain the removed hydrocarbons to form hydrocarbon containing stream 506. Hydrocarbon containing stream 506 can exit treatment unit 504 and enter collection unit 508 to be processed as previously described. In some embodiments, the bed of organosilica particles is heated using a heater in combination with a heated regenerate stream.

In some embodiments, treatment of a gaseous stream and regeneration of the organosilica particles can be in done in a multiple bed configuration, for example a 2, 3, 4, 5, 6, 7, 8, 9, 10, or more bed configuration, preferably a 2 or 3 bed configuration. FIG. 6 is a schematic of a two bed system 600 for treatment of a gaseous system and regeneration of the organosilica particles. In FIG. 6, gaseous stream 106 enters treatment unit 104 through inlet 602. In treatment unit 104, gaseous stream 106 contacts the organosilica particles under conditions sufficient to capture $C_{3+}$ hydrocarbons from the gaseous stream as described throughout the specification to obtain treated gaseous stream 108. Treated gaseous stream 108 exits treatment unit 104 via treatment unit outlet 604. When breakthrough of $C_{3+}$ hydrocarbons or $C_{4+}$ hydrocarbons is observed using testing equipment and/or sensors positioned near or in treatment unit outlet 604, flow of gaseous stream 106 into inlet conduit 602 can be discontinued to treatment unit 104 and diverted to treatment unit 202. Gaseous stream 106 can enter treatment unit 202 via treatment inlet conduit 608 and contact organosilica particles in treatment unit 202 under conditions sufficient to obtain treated gaseous stream 108' as described throughout the specification. Treated gaseous stream 108' exits treatment unit 202 via treatment outlet 610. While gaseous stream 106 is being treated in treatment unit 202, heated regenerate gas 502 can be provided to treatment inlet 602 to start the regeneration process as described in FIGS. 5A and 5B and throughout this specification to produce hydrocarbon containing stream 506. Hydrocarbon containing stream 506 can exit treatment unit 104 via treatment outlet 604 and enter cooling unit 508. In cooling unit 508, hydrocarbon containing stream 506 can be cooled and hydrocarbons collected as described throughout the specification. After a period of time, cooled regenerate gas is provided to treatment unit 104 via treatment unit inlet 602 and forms hydrocarbon containing stream 506 after contact with the heated organosilica particles. Such heat exchange cools the organosilica particles under conditions that $C_3+$ hydrocarbons that have been removed from the organosilica particles are not recaptured. Valves 606 can be used to regulate the flow of gaseous stream 106, heated regenerate stream 502, cooled regenerate stream 516, and hydrocarbon containing steam 506. While specific valves, inlets and outlets are shown, it should be understood that conduits, other valves, gas manifold with multiple valves, inlets and outlets can be used. The process as described in FIG. 6 can be used be continued in multiple beds. The processes described throughout this specification can be done as batch processes or as continuous processes.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Organosilica Particle Capacity for Gas Phase Alkanes

Capacity of Organosilica Particles for Gas Phase Alkanes.

A gas sample was contacted with the organosilica particles at 25° C. at 1 atm. The organosilica particles were analyzed to determine the weight fraction absorbed by the media at breakthrough. The organosilica particles absorbed about 10% of their weight of butane, 30% of their weight of pentane, and 60 to 70% of their weight of $C_{6-8}$ hydrocarbons. The increase of weight percentage of $C_4+$ hydrocarbons indicated that the capacity of the organosilica particles has been maximized. FIG. 5 is a graph of n-alkane boiling points (° C.) versus weight fraction absorbed at break though for at 25° C. and 1 atm.

Example 2

Equipment Set-Up

A stainless steel media vessel having a gas inlet at the top of the unit, a gas outlet at the bottom of the unit, and a vacuum compressor attached to the top of the vessel was provided to gas production sites.

Example 2

Testing

Trial 1. Pipeline.

Figure 7:
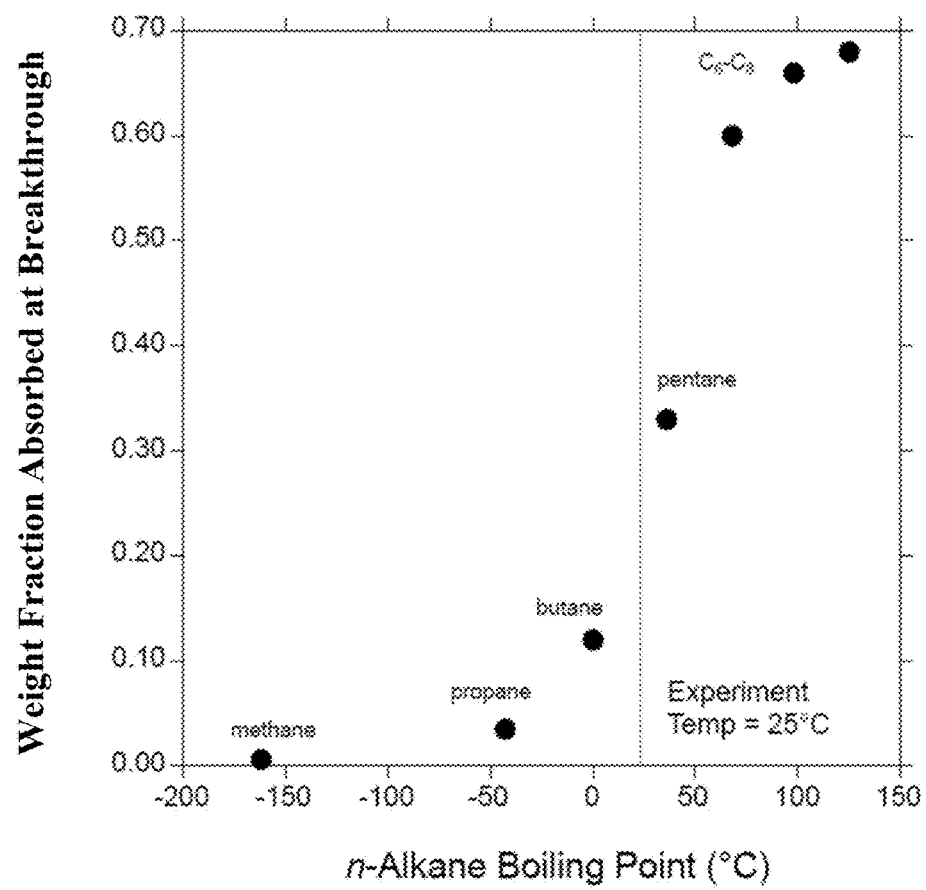
FIG. 7 is a graph of n-alkane-boiling points in degree centigrade versus weight fraction absorbed at breakthrough.
Figure 8:
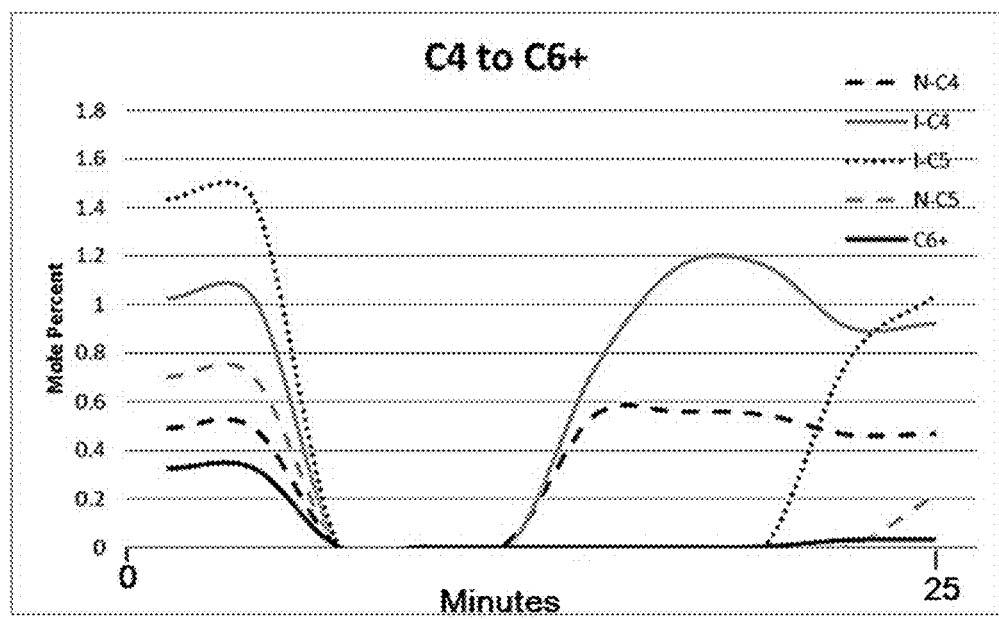
FIG. 8 is a graph of time versus mole percent of $C_4$, $C_5$ and $C_{6+}$ hydrocarbons.
Figure 9:
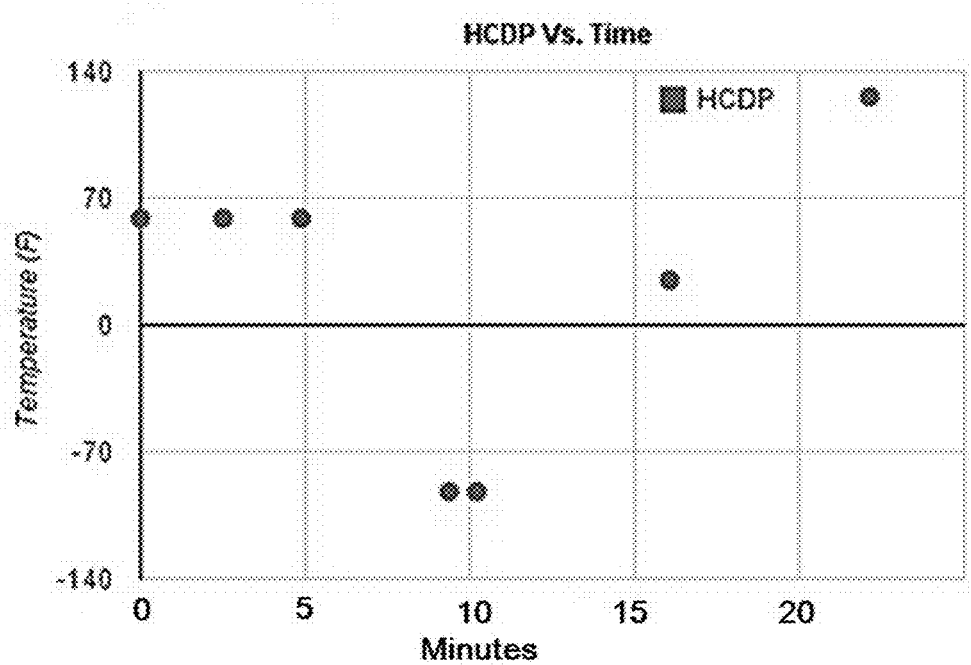
FIG. 9 is a plot of calculated hydrocarbon dew point temperatures over time as determined from the molar concentrations from FIG. 8.

A gaseous stream having a hydrocarbon dew point value of about 15.5 to 23.8° C. (60-75° F.) at a pressure of 85 psig (0.59 MPa(g)) was diverted from a sales pipeline to the media vessel containing organosilica particulate media (Osorb® media, 40 kg). The gas traveled through the column of media (approximately 8 feet in height). The gas exited the bottom of the vessel where it traveled through a particulate filter, in case fine media particles were carried through the screen in media vessel. From there, the gas stream passed through a pressure regulator and check valve and passed by sample ports before returning to the sales line. FIG. 7 depicts the molar concentration of $C_4+$ hydrocarbons over time as determined by third party gas chromatography analysis. FIG. 8 depicts a graph of the molar concentrations of n-butane (N—C4), isobutane (I—C4), n-pentane (N—C5), isopentane (I—C5), and all hexane or heavier hydrocarbons (C6+) before and during the trial. FIG. 9 depicts the calculated hydrocarbon dew point temperatures over time as determined from the values shown in FIG. 8 at the treatment pressure. The treated gaseous stream was determined to have hydrocarbon dew point value of −90° F. (−67.8° C.). From the data in FIGS. 8 and 9, the organosilica particles removed $C_4+$ compounds and lowered the hydrocarbon dew point value of the treated gaseous stream relative to the gaseous stream prior to contact. Furthermore, from analysis of the data, it was determined that when the organosilica particulate media captured its capacity of butanes it stopped capturing the butanes, but the organosilica particulate media continued to capture pentanes and higher molecular weight hydrocarbons. Similarly, the organosilica media stopped capturing pentanes at the end of the trial, but was still capturing hexanes and heavier species. In addition to having a larger total capacity for hydrocarbons with a higher molecular weight, the organosilica particulate media also maintains partial capture of these species for a longer time after initial breakthrough. As can be seen in FIG. 8, the concentration of butanes in the treated gas stream returned to its level in the untreated gas relatively quickly after the media reached its capture capacity for butanes, while the concentration of pentanes in the treated gas stream had not returned to its level in the untreated gas by the end of the trial.

Trial 2-Wellhead.

A 6" in diameter vessel was filled with organosilica particles (1 kg, Osorb® media. Tubing (⅜") was used to tie-in to the instrument gas flow on the gas processing unit (GPU) and to the gas to the media vessels. After the organosilica particle vessel, the flow path continued to a HCDP analyzer. A silica gel cartridge was positioned between the organosilica media vessel and the analyzer to remove water from the sample. The effluent of the analyzer was diverted back to the instrument gas flow path within the GPU. Table 1 lists the values for the gaseous stream coming from the effluent of the GPU (the source of the instrument gas). The analyzer directly measured the dew point value of the gas rather than calculating the dew point indirectly based on other properties (e.g. molar composition). The analyzer measured the dew point value of both hydrocarbons and non-hydrocarbons (generally water) and distinguished between the two; however, it would only read either the HCDP or the non-hydrocarbon dew point (non-HCDP) on a given reading depending on which was at higher temperature. The instrument registered an error if either dew point was above 50° F., and it stopped analyzing if both dew points were below 20° F. The test period was about 5.5 hours.

TABLE 1

| Component | mol % |
|---|---|
| $C_1$ | 76.866% |
| $C_2$ | 14.927% |
| $C_3$ | 5.030% |
| $i-C_4$ | 0.451% |
| $n-C_4$ | 1.218% |
| $i-C_5$ | 0.196% |
| $n-C_5$ | 0.258% |
| $i-C_6$ | 0.077% |
| $n-C_6$ | 0.064% |

TABLE 1-continued

| Component | mol % |
|---|---|
| Benzene | 0.001% |
| Cyclo-$C_6$ | 0.007% |
| i-$C_7$ | 0.037% |
| n-$C_7$ | 0.018% |
| Toluene | 0.002% |
| i-$C_8$ | 0.024% |
| n-$C_8$ | 0.006% |
| Ethylbenzene | 0.000% |
| Xylene | 0.002% |
| i-$C_9$ | 0.021% |
| n-$C_9$ | 0.005% |
| i-$C_{10}$ | 0.020% |
| n-$C_{10}$ | 0.006% |
| $C_{11}$ | 0.006% |
| $C_{12}$ | 0.030% |
| $C_{13}$ | 0.005% |
| $C_{14}+$ | 0.011% |
| $N_2$ | 0.548% |
| $CO_2$ | 0.164% |

The dew point readings measured by the analyzer throughout the test can be seen in graph FIG. 8. FIG. 8 is a graph of dew points and pressure over time. The initial gas pressure was 646 psig (4.45 MPa(g)) and an ambient temperature of 82° F. (27.7° C.). The analyzer measured the non-HCDP of the gas to be elevated at the beginning of the test. After about 40 minutes, the non-HCDP of the gas was measured to be 41.7° F. (5.4° C.) before the value began to fall. The readings were not recorded after the non-HCDP of the gas was measured to be below 20° F. (−6.67° C.), because this implied that the HCDP was also below 20° F. (−6.67° C.). The analyzer measured a continuously falling non-HCDP value with each new reading until the analyzer measured a HCDP of 10.7° F. (−11.8° C.) after 220 minutes of testing. After this HCDP reading, the HCDP slowly increased with each new reading. The test was stopped once the analyzer measured its first HCDP value above 20° F. (−6.67° C.) (20.2° F., −6.5° C.), which was about 5.5 hours into the test. As shown in Trial 2, the contact of the gaseous stream from a wellhead with the organosilica particles produced a treated gaseous stream having a hydrocarbon dew point lower than the hydrocarbon dew point value of the gaseous stream prior to contacting.

Trial 3-Wellhead.

A 3" in diameter vessel was filled with organosilica particles (0.5 kg, Osorb® media) and used with the equipment and the same well as described in Trial 2. The testing period was about 8.5 hours.

Figure 10:
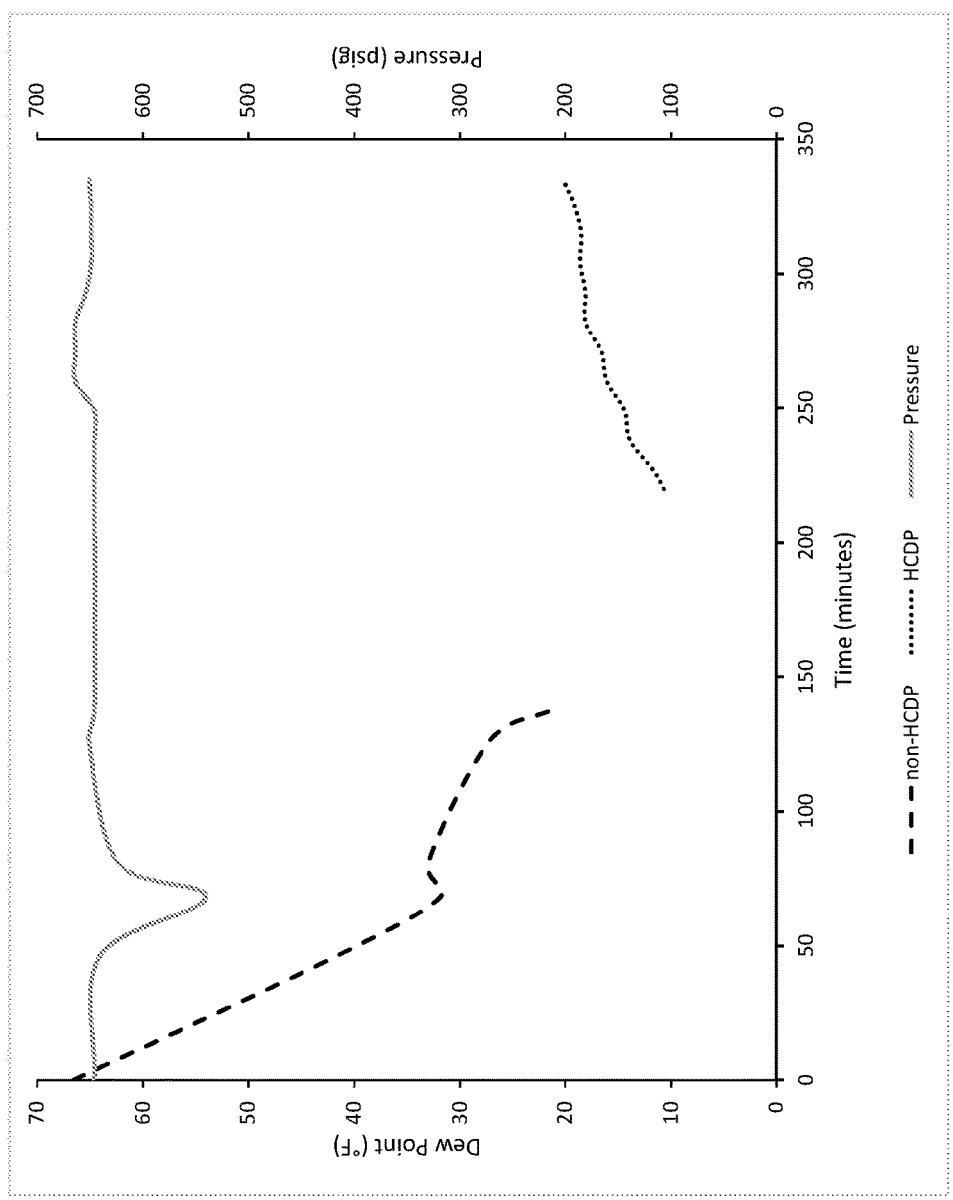
FIG. 10 are graphs of time in minutes versus dew point in degrees Fahrenheit for hydrocarbon and non-hydrocarbon compounds and pressure in pounds per square inch gauge.
Figure 11:
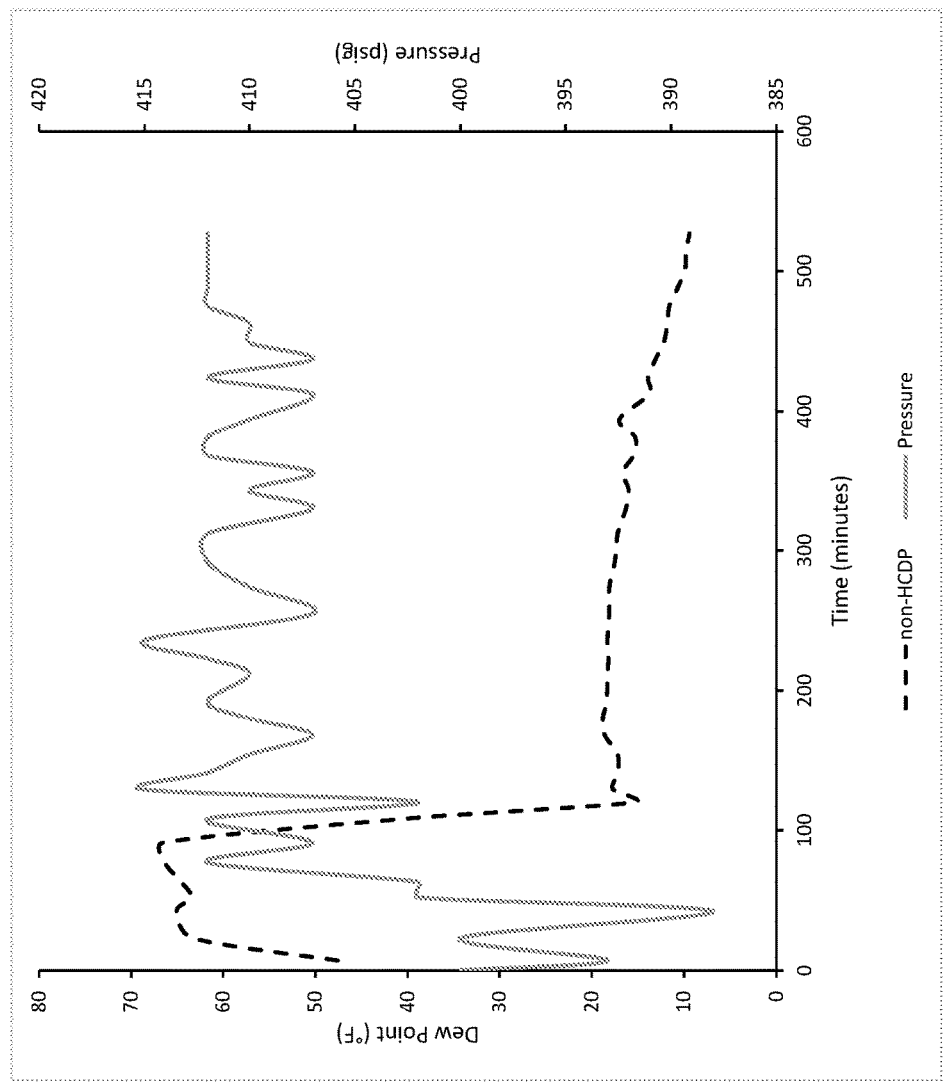
FIG. 11 are graphs of time in minutes versus dew point in degrees Fahrenheit for hydrocarbon and non-hydrocarbon compounds and pressure in pounds per square inch gauge.

The dew point readings obtained by the analyzer throughout Trial 3 are depicted in FIG. 10. FIG. 11 is a graph of hydrocarbon dew point and pressure over time. The pressure during this test ranged from 388 psig to 415 psig (2.67 to 2.86 MPa(g)). The gas pressure at the start of the test was 400 psig (2.75 MPa(g)) and an ambient temperature of 78° F. (25.55° C.) with a hydrocarbon dew point value of greater than 60° F. (15.5° C.) The analyzer measured the non-HCDP of the gas to be elevated above 30° F. (−6.67° C.) until, after about 1.5 hours, the reading for non-HCDP of the gas dropped rapidly. The analyzer continued to measure a non-HCDP value below 20° F. (−6.67° C.), which implied that the HCDP was also below 20° F. (−6.67° C.). As shown in Trial 3, the contact of the gaseous stream from a wellhead with the organosilica particles produced a treated gaseous stream having a hydrocarbon dew point lower than the hydrocarbon dew point value of the gaseous stream prior to contacting.

Example 3

Regeneration of Organosilica Particles Using Internal Heating of Bed of Organosilica Particles Equipment. The treatment vessel includes stainless steel coils (100 feet of ⅜") wrapped in heat tape and in spaced 1¾" apart (vessel coils). A compressed nitrogen ($N_2$) tank was added, as well as the associated plumbing between the tank, heating coils, and vessel. An air fan was added, as well as plumbing between the fan, heating coils, and vessel. Insulation was added to the vessel and to the lines between the heating coils and the vessel. Three (3) condensate drips (collection unit) were added downstream of the vessel and each was kept at a different temperature.

1. Steam Heating with Cooled Regenerate Stream.

At the start of the regeneration, the bed of organosilica particles (media) was at a temperature of 62° F. (16.7° C.). Steam was circulated through the coils for about 1 hour to heat the media to a temperature of 124° F. (51.1° C.). Gas flow (50 psig nitrogen at 80 ft³/hour) was started until the temperature of the bed had reached 142° F. (61.1° C.) at which time the flow was reduced (40 ft³/hour). After one hour of reduced nitrogen flow, the flow of steam was stopped when the temperature of the bed did not deviate significantly from 152° F. (66.7° C.). Gas flow was continued until production of condensate diminished or stopped in the collection unit (about 90 minutes). A total of 900 mL of condensate was obtained from the media (40 Kg).

Figure 12:
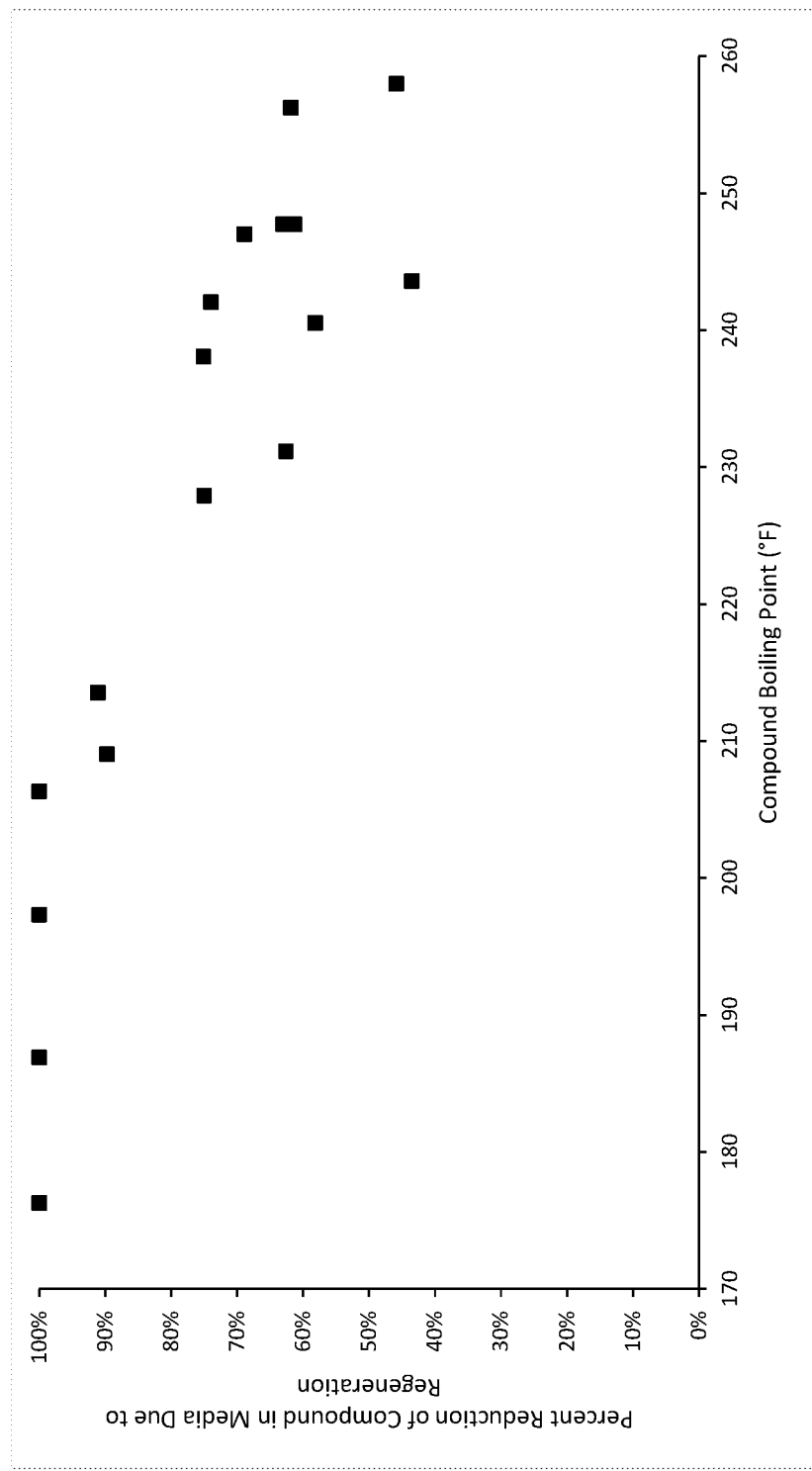
FIG. 12 is a graph of compound boiling point in degrees Fahrenheit versus percent reduction of compound in media due to regeneration.

Saturated media was collected prior to regeneration and an extraction was performed on a representative sample of the media. The hydrocarbons extracted from the media and the amounts of hydrocarbons having boiling points ranging from 90 to 267° F. (32.2 to 130° C.) was determined. After regeneration, the regenerated media was extracted and the amounts of hydrocarbons left in the media having a boiling points ranging from 90 to 267° F. (32.2 to 130° C.) was determined. FIG. 12 are graphs of a selection of the species that were captured by the media during gas treatment (sorted by the boiling point of the captured species) and the percent by which those species were reduced in the media by each of the regeneration processes. As can be seen in FIG. 12, the media that was regenerated.

2. Oil Heating with Cooled Regenerate Stream.

At the start of the regeneration, the bed of organosilica particles (media) was at a temperature of 87° F. (30.5° C.). Oil at a temperature of 375° F. (190° C.) was circulated through the coils for about 1 hour to heat the media to a temperature of 150° F. (65.5° C.) and the oil temperature had fallen to 314° F. (156° C.). Gas flow (50 psig nitrogen at 80 ft³/hour) was started until the temperature of the bed had reached 248° F. (120° C.). The gas flow was continued until production of condensate diminished or stopped in the collection unit (about 3 hours). A total of 250 mL of condensate was obtained from the media.

Example 4

Treatment of Gas Using Regenerated Organosilica Particles and Regeneration of Organosilica Particles The organosilica particles regenerated in Example 3 was used to treat the gas once again as set forth in Examples 1 and 2. Samples of the outlet gas were collected throughout the treatment phase and were analyzed in a laboratory setting using a GCMS. The instrument was not calibrated to the samples being analyzed, so the results (shown in FIG.

Figure 13:
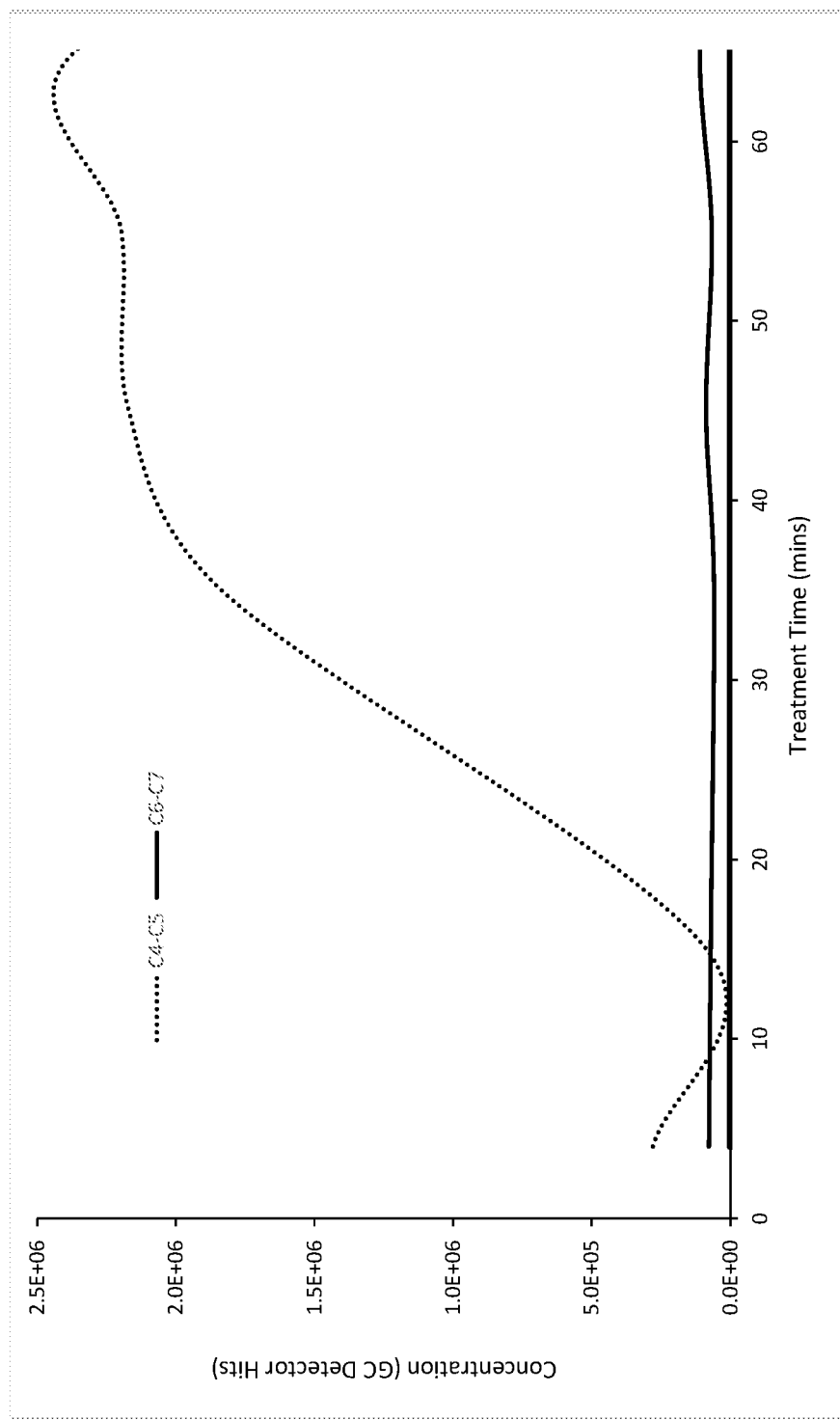
FIG. 13 is a graph of treatment time in minutes versus concentration in gas chromatograph detector hits.

13) are given in relative rather than absolute units. As can be seen in the figure, the media stopped capturing $C_4$ and $C_5$ species during the scheduled testing period, but it was still capturing $C_{6+}$ species at the conclusion of the treatment phase. As shown in FIG. 13, the regenerated organosilica particles could be used to treat a gaseous stream after regeneration.

The gaseous stream was discontinued and the regeneration phase began. The bed of organosilica particles was at a temperature of 73° F. (22.7° C.). Oil at a temperature of 375° F. (190° C.) was circulated through the coils and the flow of heated nitrogen was started at the same time as the flow of oil. Condensate was collected from the ambient drip, the ice drip, and the dry ice drip. Much of the condensate collected from the dry ice drip near the beginning of the process evaporated upon exposure to atmospheric conditions, which suggested that components as light as propane had been captured by the media during treatment and were now being reclaimed in the condensing process. After three and a half hours of regeneration, the bed temperature was 250° F. (121° C.) so the flow of oil was stopped. The nitrogen flow was stopped approximately half of an hour after the oil flow was stopped.

Figure 14:
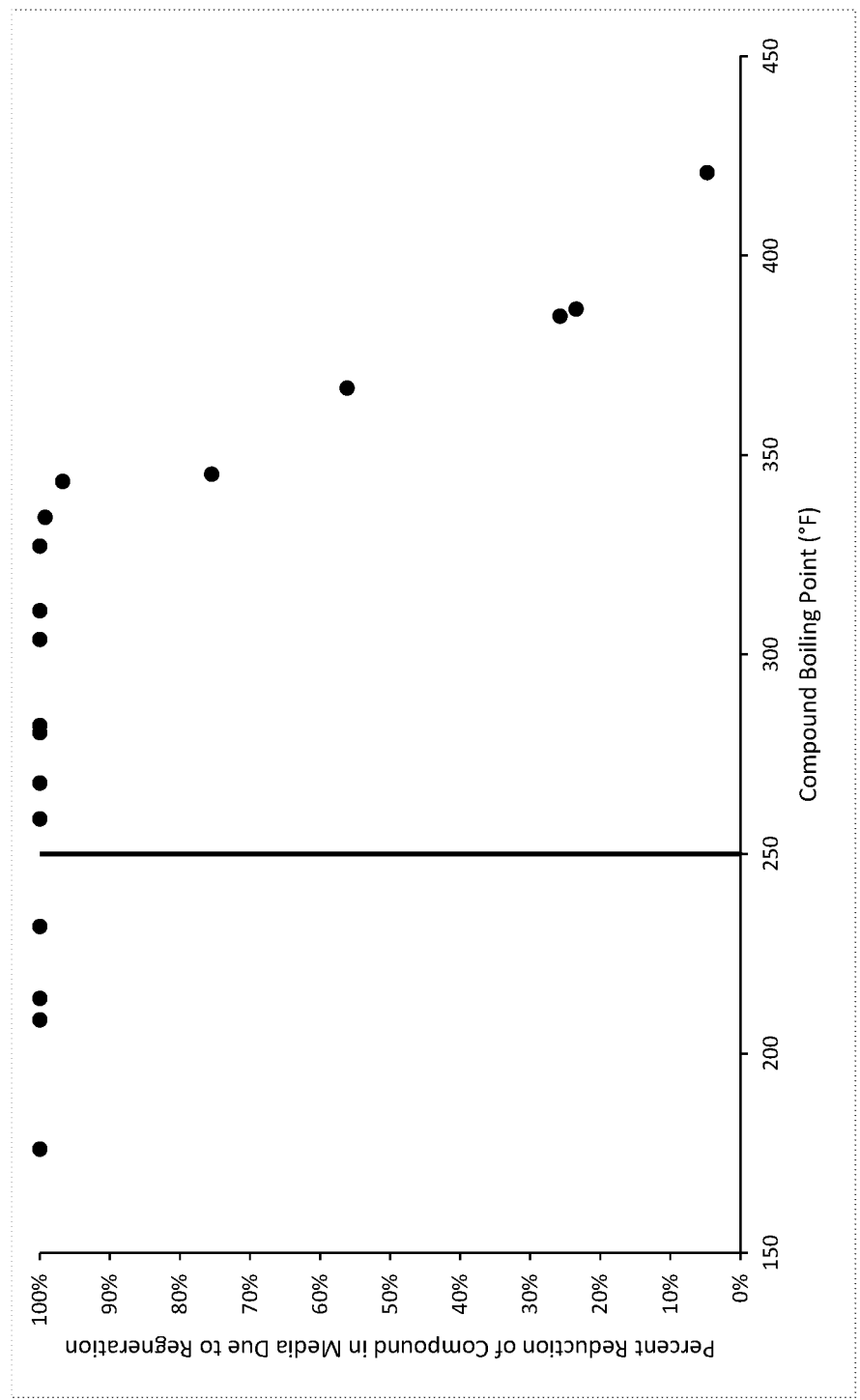
FIG. 14 is a graph of compound boiling point in degrees Fahrenheit versus percent reduction of compound in media due to regeneration.

Extractions were performed on the organosilica particles collected before and after the regeneration process. Analysis of these extractions was used to determine the percent by which several species were reduced in the media during this regeneration process (see FIG. 14). The regeneration process removed 100% of the captured hydrocarbons that had a boiling point up to 325° F. (162.8° C.) even though the bed temperature was at 250° F. (121° C.). Species with higher boiling points, however, were only partially removed from the media or were not removed at all. Examples 3 and 4 demonstrate that the organosilica particles can be regenerated and the regenerated organosilica particles can be used to treat a gaseous stream to remove $C_3+$ hydrocarbons.

The invention claimed is:

1. A method for regenerating a bed of organosilica particles, the method comprising:
    (a) heating a regenerate stream comprising $C_{1-2}$ hydrocarbons, to produce a heated regenerate stream;
    (b) introducing the heated regenerate stream to a bed of organosilica particles comprising absorbed $C_{3+}$ hydrocarbons under conditions sufficient to remove at least a portion of the absorbed $C_{3+}$ hydrocarbons from the bed of organosilica particles and produce a heated bed of organosilica particles;
    (c) removing a combined stream comprising the heated regenerate stream together with the at least a portion of the absorbed $C_{3+}$ hydrocarbons from the heated bed of organosilica particles;
    (d) cooling the combined stream and separating the combined stream into a liquid stream comprising the at least a portion of the absorbed C3+ hydrocarbons and a cooled regenerate gaseous stream comprising said $C_{1-2}$ hydrocarbons present in the regenerate stream of step (a); and
    (e) introducing the cooled regenerate gaseous stream to the heated bed of organosilica particles.

2. The method of claim 1, wherein a temperature of the heated regenerate stream is 50° C. or above and a pressure of the heated regenerate stream is 1 atm or above.

3. The method of claim 2, wherein a temperature of the heated bed of organosilica particles is 50° C. to 110° C. and a pressure of the heated bed of organosilica particles is 1 atm or above.

4. The method of claim 1, further comprising repeating steps (a) through (e) until a majority of the absorbed $C_{3+}$ hydrocarbons are removed from the heated bed of organosilica particles.

5. The method of claim 1, further comprising obtaining the bed of organosilica particles comprising the absorbed $C_{3+}$ hydrocarbons prior to step (b).

6. The method of claim 1, wherein the bed of organosilica particles in step (b) is heated with an additional heat source in addition to the heated regenerate stream and wherein the additional heat source is used to provide heat to the heated bed of organosilica particles in step (e).

7. The method of claim 1, wherein the heated regenerate stream is the only heat source used to heat the bed of organosilica particles.

8. The method of claim 1, wherein the removed $C_{3+}$ hydrocarbons have a boiling point of −50° C. to 250° C. at 1 atm.

9. The method of claim 8, wherein the removed $C_3+$ hydrocarbons have a carbon number from 3 to 15.

10. A method for producing a treated gaseous stream comprising:
    (a) providing a gaseous stream comprising $C_{3+}$ hydrocarbons to a bed of organosilica particles under conditions sufficient to absorb some of the $C_{3+}$ and to obtain a treated gaseous stream; and
    (b) regenerating the bed of organosilica particles by:
        (i) heating a regenerate stream comprising $C_{1-2}$ hydrocarbons, to produce a heated regenerate stream;
        (ii) providing the heated regenerate stream to the bed of organosilica particles comprising the absorbed $C_{3+}$ hydrocarbons under conditions sufficient to remove at least a portion of the absorbed $C_{3+}$ hydrocarbons from the bed of organosilica particles and produce a heated bed of organosilica particles;
        (iii) removing a combined stream comprising the heated regenerate stream together with the at least a portion of the absorbed $C_{3+}$ hydrocarbons from the heated bed of organosilica particles;
        (iv) cooling the combined stream and separating the combined stream into a liquid stream comprising the at least a portion of the absorbed C3+ hydrocarbons and a cooled regenerate gaseous stream comprising said $C_{1-2}$ hydrocarbons present in the regenerate stream of step (i); and
        (v) introducing the cooled regenerate gaseous stream to the heated bed of organosilica particles.

11. The method of claim 10, further comprising stopping said providing of the gaseous stream in step (a) prior to step (b).

12. The method of claim 10, further comprising alternating step (a) with step (b) as needed to maintain one or more properties of the treated gaseous stream.

13. The method of claim 12, wherein the one or more properties are selected from the group consisting of hydrocarbon dew point, higher heating value, Wobbe Index, and methane number.

14. The method of claim 10, wherein the bed of organosilica particles are positioned in a treatment vessel prior to step (a), and further comprising removing the organosilica particles from the treatment vessel after step (a) and providing the organosilica particles to a regeneration vessel prior to step (b).

15. The method of claim 10, wherein the conditions in step (a) comprise a temperature of 60° C. or less and a pressure of 0.1 MPa(g) or more.

16. The method of claim 10, wherein the heated regenerate stream is derived from the treated gaseous stream in step (a).

* * * * *